(12) United States Patent
Pelka et al.

(10) Patent No.: US 6,647,199 B1
(45) Date of Patent: Nov. 11, 2003

(54) LIGHTING APPARATUS HAVING LOW PROFILE

(75) Inventors: David G. Pelka, Los Angeles, CA (US); John Popovich, Del Mar, CA (US); Yong Qiao, Arcadia, CA (US)

(73) Assignee: Teledyne Lighting and Display Products, Inc., Hawthorne, CA (US)

( * ) Notice: Subject to any disclaimer, the term of this patent is extended or adjusted under 35 U.S.C. 154(b) by 0 days.

(21) Appl. No.: 09/334,848

(22) Filed: Jun. 16, 1999

Related U.S. Application Data

(60) Division of application No. 08/936,717, filed on Sep. 24, 1997, now Pat. No. 6,043,591, which is a continuation-in-part of application No. 08/764,298, filed on Dec. 12, 1996, now abandoned.

(51) Int. Cl.⁷ ................................................ G02B 6/00
(52) U.S. Cl. .................... 385/146; 385/901; 362/31; 362/558; 362/559; 362/560; 362/29
(58) Field of Search ............... 362/555, 22, 29, 362/30, 31, 558, 559, 560; 385/146, 901, 14

(56) References Cited

U.S. PATENT DOCUMENTS

| | | | |
|---|---|---|---|
| 1,734,834 A | 11/1929 | Steward et al. | 350/96.15 |
| 2,448,244 A | 8/1948 | Arnold | 362/32 |
| 2,761,056 A | 8/1956 | Lazo | 362/32 |
| 2,907,869 A | 10/1959 | Hudson et al. | 350/96.18 |
| 3,223,833 A | 12/1965 | Protzmann | 350/96.1 |
| 3,300,646 A | 1/1967 | Casebeer | 350/96.1 |
| 3,349,234 A | 10/1967 | Schwarz | 350/96.18 |
| 3,539,796 A | 11/1970 | Zychal | 350/96.18 |
| 3,586,851 A | 6/1971 | Rudolph | 240/47 |
| 3,610,941 A | 10/1971 | West | 250/227 |

(List continued on next page.)

FOREIGN PATENT DOCUMENTS

| | | |
|---|---|---|
| DE | 23 09 586 | 8/1973 |
| DE | 3 633203 | 9/1986 |
| DE | 3825436 | 7/1988 |
| DE | 42 37 107 A1 | 5/1994 |
| EP | 0 403 764 A1 | 4/1990 |
| EP | 0 442 529 A2 | 8/1991 |
| EP | 0 531 939 A1 | 3/1993 |
| EP | 0 732 679 A1 | 9/1996 |
| EP | 0 733 850 A2 | 9/1996 |
| EP | 0 733 928 A2 | 9/1996 |
| GB | 2 283 849 | 5/1995 |
| JP | 63-55503 | 3/1988 |
| JP | 63-206713 | 8/1988 |
| JP | 2-143202 | 6/1990 |
| WO | WO 92/13232 | 8/1992 |
| WO | WO 97/30431 | 8/1997 |
| WO | WO 97/30431 A2 | 8/1997 |
| WO | 99/06759 | 7/1998 |

OTHER PUBLICATIONS

U.S. patent application Ser. No. 08/936,717 entitled *Lighting Apparatus Having Low Profile* filed Sep. 24, 1997.

*Primary Examiner*—Hemang Sanghavi
(74) *Attorney, Agent, or Firm*—Kirkpatrick & Lockhart LLP

(57) ABSTRACT

Disclosed is a low profile lighting apparatus that is particularly advantageous for use as a backlight for illuminating a display. The lighting apparatus includes a waveguide coupled to a light source for injecting light into the waveguide. The waveguide includes a plurality of elongate structures for ejecting light propagating within the waveguide through a predetermined surface of the waveguide. Another embodiment of the waveguide includes a central region of reduced thickness that redirects light propagating within the waveguide. The lighting apparatus has a low profile so it is particularly useful in areas of limited space.

14 Claims, 13 Drawing Sheets

U.S. PATENT DOCUMENTS

| | | | |
|---|---|---|---|
| 3,752,974 A | 8/1973 | Baker et al. ............... 240/8.16 |
| 3,754,130 A | 8/1973 | Stone et al. ............... 240/6.43 |
| 3,821,590 A | 6/1974 | Kosman et al. |
| 3,957,351 A | 5/1976 | Stockwell ............. 350/160 LC |
| 4,011,001 A | 3/1977 | Moriya ...................... 240/6.43 |
| 4,043,636 A | 8/1977 | Eberhardt et al. .......... 350/160 |
| 4,115,994 A | 9/1978 | Tomlinson ................... 362/23 |
| 4,118,110 A | 10/1978 | Saurer et al. ............... 350/334 |
| 4,183,628 A | 1/1980 | Laesser et al. ............. 350/338 |
| 4,195,915 A | 4/1980 | Lichty et al. ............... 350/345 |
| 4,212,048 A | 7/1980 | Castleberry ................. 362/19 |
| 4,252,416 A | 2/1981 | Jaccard ...................... 350/345 |
| 4,257,084 A | 3/1981 | Reynolds ..................... 362/30 |
| 4,392,750 A | 7/1983 | Mettler ...................... 368/228 |
| 4,440,474 A | 4/1984 | Trcka ........................ 368/228 |
| 4,453,200 A | 6/1984 | Trcka et al. ................. 362/31 |
| 4,528,617 A | 7/1985 | Blackington ................. 362/32 |
| 4,560,264 A | 12/1985 | Kitazawa et al. ........... 354/219 |
| 4,616,295 A | 10/1986 | Jewell et al. ................ 362/31 |
| 4,649,462 A | 3/1987 | Dabrowolski et al. ......... 362/2 |
| 4,706,173 A | 11/1987 | Hamada et al. ............. 362/341 |
| 4,714,983 A | 12/1987 | Lang ......................... 362/31 |
| 4,720,706 A | 1/1988 | Stine ......................... 362/341 |
| 4,723,840 A | 2/1988 | Humbert et al. ........... 350/345 |
| 4,735,495 A | 4/1988 | Henkes ....................... 350/345 |
| 4,737,896 A | 4/1988 | Mochizuki et al. ......... 362/301 |
| 4,766,526 A | 8/1988 | Morimoto et al. .......... 362/255 |
| 4,798,448 A | 1/1989 | van Raalte ................. 350/345 |
| 4,826,294 A | 5/1989 | Imoto ......................... 350/354 |
| 4,875,200 A | 10/1989 | Tillery ........................ 368/67 |
| 4,910,652 A | 3/1990 | Rhine ......................... 362/234 |
| 4,914,553 A | 4/1990 | Hamada et al. ............... 362/32 |
| 4,945,349 A | 7/1990 | Sanai ......................... 340/784 |
| 4,972,394 A | 11/1990 | DiMarco .................... 368/227 |
| 4,998,804 A | 3/1991 | Horiuchi .................... 368/227 |
| 5,008,658 A | 4/1991 | Russay et al. ............... 340/784 |
| 5,029,045 A | 7/1991 | Sanai et al. .................... 362/62 |
| 5,029,986 A | 7/1991 | De Vaan ..................... 350/338 |
| 5,050,946 A | 9/1991 | Hathaway et al. ............ 385/33 |
| 5,070,431 A | 12/1991 | Kitazawa et al. ............. 362/27 |
| 5,083,240 A | 1/1992 | Pasco ......................... 400/206 |
| RE33,987 E | 7/1992 | Suzawa ........................ 359/49 |
| 5,128,783 A | 7/1992 | Abileah et al. ............... 359/54 |
| 5,143,433 A | * 9/1992 | Farell .......................... 362/29 |
| 5,161,041 A | 11/1992 | Abileah et al. ............... 359/40 |
| 5,166,815 A | 11/1992 | Elderfield |
| 5,169,230 A | 12/1992 | Palmer ....................... 362/304 |
| 5,202,950 A | 4/1993 | Arego et al. ................. 385/901 |
| 5,237,641 A | 8/1993 | Jacobson et al. ........... 385/146 |
| 5,272,601 A | * 12/1993 | McKillip ..................... 362/27 |
| 5,303,322 A | 4/1994 | Winston et al. ............. 385/901 |
| 5,339,294 A | 8/1994 | Rodgers ....................... 368/67 |
| 5,381,309 A | 1/1995 | Borchardt |
| 5,410,453 A | 4/1995 | Ruskouski ................... 362/27 |
| 5,414,599 A | 5/1995 | Kaneko et al. |
| 5,438,495 A | 8/1995 | Ahlen et al. |
| 5,440,197 A | 8/1995 | Gleckman ................... 313/110 |
| 5,481,637 A | 1/1996 | Whitehead ................... 385/37 |
| 5,485,291 A | 1/1996 | Qiao et al. ..................... 362/31 |
| 5,575,549 A | 11/1996 | Ishikawa et al. .............. 362/31 |
| 5,618,096 A | 4/1997 | Parker et al. ................. 362/31 |
| 5,655,832 A | 8/1997 | Pelka et al. ................. 362/298 |
| 5,678,913 A | 10/1997 | Ishimaru et al. |
| 5,684,354 A | 11/1997 | Gleckman ................... 313/110 |
| 5,721,795 A | 2/1998 | Pelka ........................... 385/37 |
| 5,806,995 A | 9/1998 | Tsushima et al. ........... 382/268 |
| 5,883,684 A | 3/1999 | Millikan et al. ............... 362/20 |
| 6,007,209 A | 12/1999 | Pelka .......................... 362/26 |
| 6,007,225 A | 12/1999 | Ramer et al. |

* cited by examiner

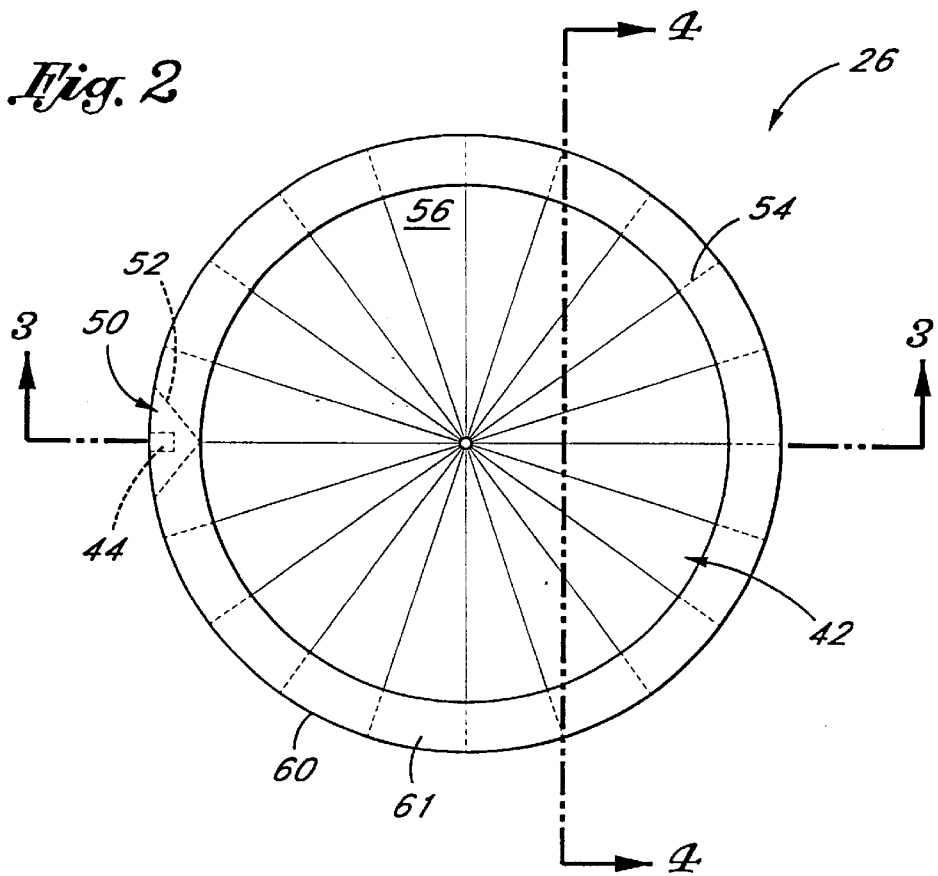
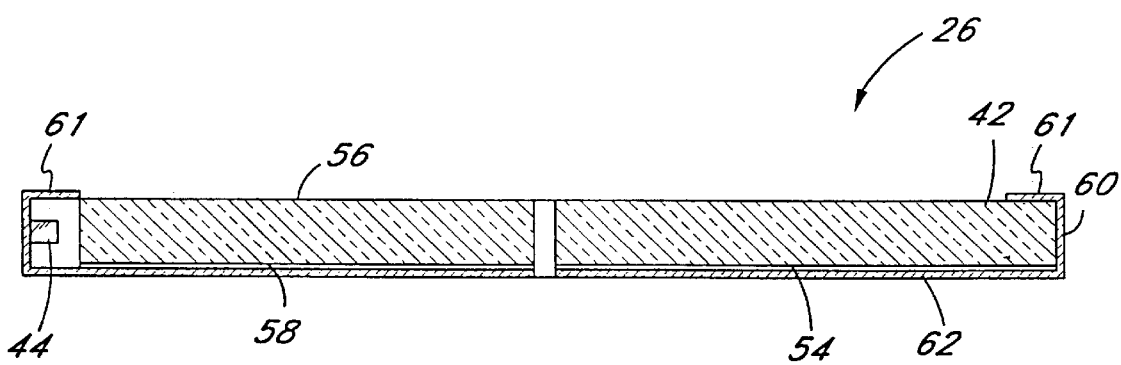

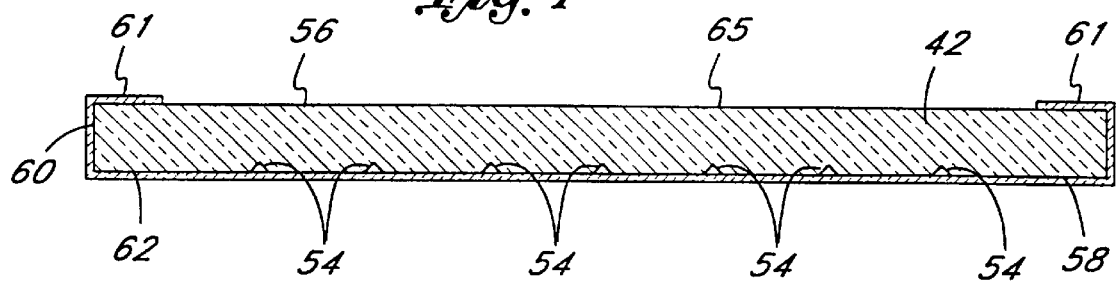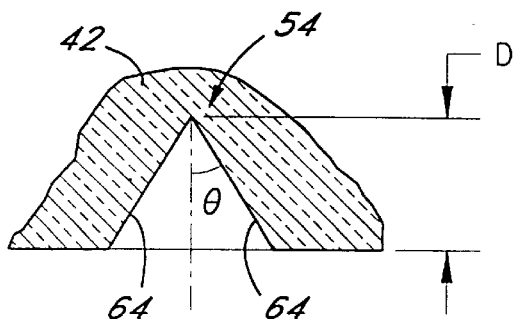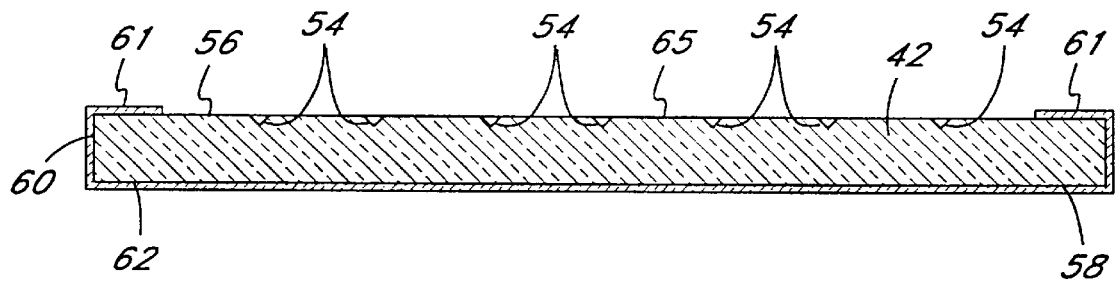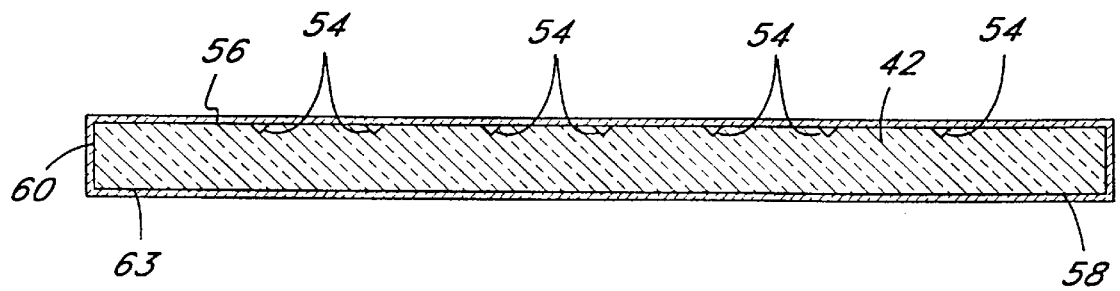

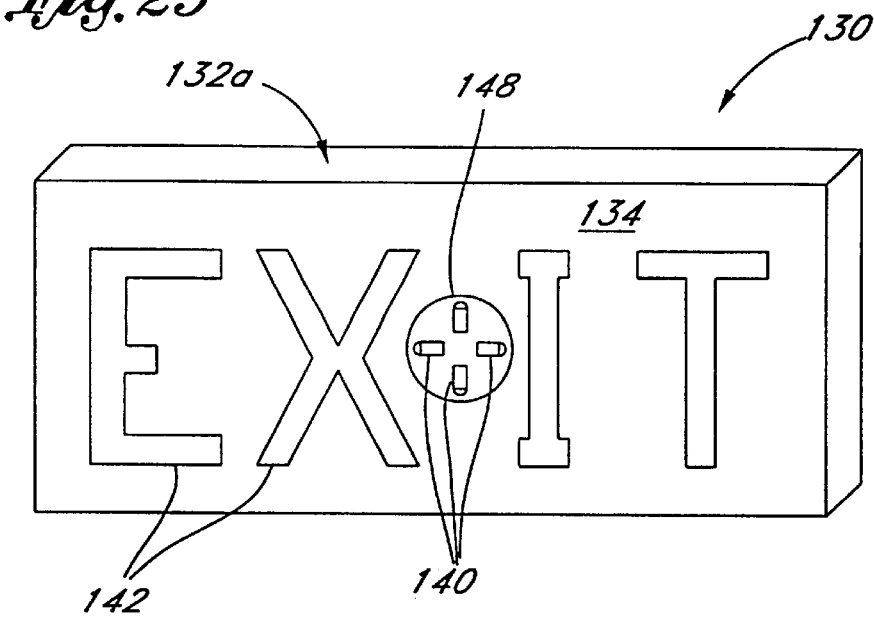
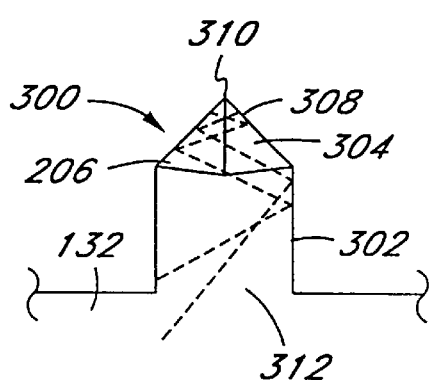
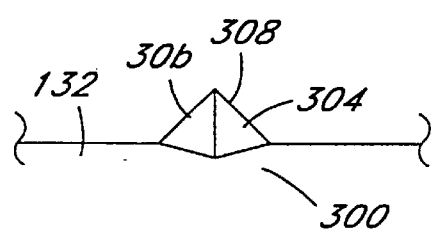
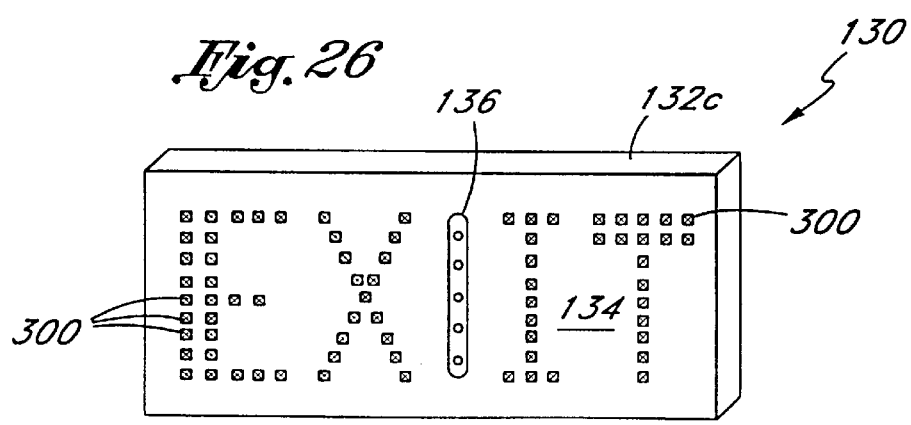

LIGHTING APPARATUS HAVING LOW PROFILE

This application is a divisional of U.S. patent application Ser. No. 08/936,717, filed Sep. 24, 1997, now U.S. Pat. No. 6,473,554, entitled "Lighting Apparatus Having Low Profile," which is a continuation in part of U.S. patent application Ser. No. 08/764,298, filed Dec. 12, 1996, now abandoned, entitled "Waveguide With Light Emitting Diodes for Illumination and Display."

BACKGROUND OF THE INVENTION

Backlights may be used to illuminate both mechanical displays, such as on analog watches or automobile gauges, as well as electronic displays, such as liquid crystal displays used with cellular phones, and pagers, and personal digital assistants. Because many backlight applications involve smaller displays where space is at a premium, it is desirable to reduce the thickness of such backlights while still maintaining the area of illumination. Backlights thus require reduced aspect ratios, defined as the ratio of the thickness of the backlight to the length of the illumination area.

One type of a backlight utilizes of a light source, such as a light-emitting diode (LED), that is coupled to a waveguide into which light is injected. The light source is typically mounted at an outer peripheral edge of the waveguide and is energized to emit light into the waveguide. The light undergoes several reflections between the surfaces of the waveguide until being transmitted through a top surface to illuminate the display.

One difficulty associated with such backlights is they do not produce a uniform intensity across the surface of the waveguide. The light loses intensity as it propagates outward from the light source. Consequently, as the distance from the light source increases, the intensity of the light transmitted out of the waveguide decreases. This results in the portions of the waveguide distal of the light source having reduced intensity.

There is therefore a need for an efficient backlight having a low aspect ratio that provides a substantially uniform illumination profile across the entire area of illumination.

SUMMARY OF THE INVENTION

One aspect of the present invention relates to a lighting apparatus for illuminating an illumination area of a display. The lighting apparatus comprises a waveguide adapted for mounting adjacent the display so as to illuminate the illumination area of the display. The waveguide comprises a top surface having an optical output area corresponding in size to the illumination area, a bottom surface spaced apart from the top surface, and a side surface extending between the top and bottom surfaces. Reflective material is positioned adjacent the bottom and side surfaces of the waveguide. At least one light source is mounted to input light proximate to a periphery of the waveguide between the top and bottom surfaces. The waveguide further comprises a light ejector on one of the top and bottom surfaces configured to redirect light propagating between the surfaces towards the top surface for transmission therethrough. The light ejector is arranged to provide a preselected illumination profile across the optical output area of the top surface.

Another aspect of the invention relates to a lighting apparatus comprising a waveguide having pair of opposed surfaces. Each of the surfaces is at least partially reflective and at least one of the surfaces is partially transmissive. Each of the surfaces have a reflectivity greater than the transmissivity of the at least one surface.

Another aspect of the invention relates to a lighting apparatus comprising a planar waveguide having a peripheral edge and a light source mounted proximate to the peripheral edge so as to direct light into the waveguide along a path extending from the light source towards an optical diverter in the waveguide. The optical diverter in the path redirects light rays away from the path towards the periphery of the waveguide.

Yet another aspect of the invention relates to a lighting apparatus comprising a top surface, a bottom surface in spaced relationship to the top surface and cooperating with the top surface to form a waveguide having a thickness defined by the distance between the top and bottom surfaces, and at least one solid state point light source mounted to input light into the waveguide between the surfaces. One of the surfaces has a curvature relative to the other surface which yields a substantial variation in the thickness of the waveguide in a selected region of the waveguide. The variation follows a geometric contour selected to redirect light propagating between the surfaces of the waveguide so that the redirected light exits the top surface of the waveguide.

Another aspect of the invention relates to a lighting apparatus comprising a waveguide having top and bottom surfaces and a peripheral edge. The waveguide has a thickness defined by the distance between the top and bottom surfaces. The thickness at the peripheral edge is substantially different than the thickness in a region intermediate opposing sides of the peripheral edge. The thickness has a geometry selected to enhance ejection of light from the top surface intermediate the opposing sides. At least one light source is disposed proximate to the peripheral edge to introduce light into the waveguide between the top and bottom surfaces.

Yet another aspect of the invention relates to a lighting apparatus comprising a waveguide of solid material, the waveguide having a top surface, a bottom surface and a side surface. A light source is mounted to input light into the waveguide and reflective material is juxtaposed with one of the top and bottom surfaces wherein at least a portion of one of the top and bottom surfaces has a pattern of elongate structures that generally increase in density with distance from the light source.

In yet another aspect of the invention, there is disclosed an illumination and display device comprising an optical waveguiding layer and an illumination coupler embedded in an interior region of the waveguiding layer. In one embodiment, the illumination coupler includes one or more semiconductor light emitting devices. A portion of the optical waveguiding layer has a pair of symmetric (a) nonplanar, curved surfaces, or (b) a plurality of flat, planar surfaces approximating the nonplanar, curved surface. The pair of symmetric surfaces form a cusp lying on the axis of the one or more semiconductor light emitting devices to produce total internal reflection of light from the one or more semiconductor light emitting devices into the waveguiding layer. Display elements are formed on surfaces of the waveguiding layer to cause light to be emitted from the waveguiding layer.

Another aspect of the invention relates to an illumination and display device, comprising an optical waveguiding layer, with an illumination coupler embedded in an interior region of the waveguiding layer, wherein the illumination coupler includes one or more semiconductor light. emitting devices. Display elements formed on the surface of the waveguiding layer cause light to be emitted from the waveguiding layer.

Yet another aspect relates to an illumination and display device, comprising an optical waveguiding layer with an illumination coupler embedded in an interior region of the waveguiding layer. In one embodiment, the illumination coupler includes one or more semiconductor light emitting devices, each of the one or more semiconductor light emitting devices having a longitudinal axis that is parallel to the surface of the optical waveguiding layer. A hole or recess may be formed in the interior region of the waveguiding layer where the one or more semiconductor light emitting devices is placed. The device also may comprise display elements formed on the surface of the waveguiding layer to cause light to be emitted from the waveguiding layer.

A further aspect of the invention is directed to an illumination device comprising a waveguide having an illumination coupler embedded in an interior region thereof. The waveguide has generally parallel top and bottom surfaces outside of the interior region such that light is guided therebetween. The illumination coupler comprises a refractive index interface configured to capture light rays propagating along a line that forms less than the critical angle of total internal reflection with respect to at least one of the top and bottom surfaces, such that the captured light rays are injected therebetween for propagation outside of the interior region. In one embodiment, the illumination coupler comprises a surface configured for total internal reflection of light incident thereon. The illumination coupler of this embodiment is integrally formed with the waveguide from a single piece of transparent material, and the reflecting surface is uncoated. A point source of light is disposed at least partially, preferably fully, within a cavity formed in the waveguide adjacent the total internal reflecting surface. Display elements may be included on at least one of the surfaces for ejecting light from the waveguide. Additionally, diffusive reflective material may be included on at least one of the top and bottom surfaces.

In yet another aspect of the invention, there is disclosed a lighting apparatus, comprising a device that emits light and an optical cavity that is formed by diffusive reflective surfaces, the cavity having an output region through which light from the cavity passes. The light emitting device is mounted to supply light to the cavity while being hidden from direct view through the output region. The cavity has a diffusely reflective surface area and the output region also has an area. The ratio of the area of the output region to the sum of (i) the area of the output region and (ii) the surface area of the cavity is at least 0.05. Additionally, the cavity has a depth and the output region has an edge to edge bisector dimension, the ratio of the depth to the bisector dimension being significantly less than 0.1. The lighting apparatus additionally comprises an angular spectrum restrictor positioned to restrict output illumination through the output region to a predetermined range of angles.

Another aspect of the invention involves a method of lighting. The method comprises producing illumination from an optical cavity formed by diffusely reflecting surfaces and outputting illumination from the cavity through an output illumination region. Producing of the illumination comprises directing light rays from a source of illumination into the cavity such that the source of the illumination is not visible through the output illumination region. The method further comprises restricting the angular spectrum of illumination from the output illumination region to a predetermined range of angles, and mounting the optical cavity to illuminate at least a portion of a room.

In another aspect of the invention, there is disclosed a method of manufacturing a lighting apparatus. One embodiment of the method comprises wrapping a flexible sheet of reflective material around one side of a tubular light source, juxtaposing a member forming an optical cavity with another side of the tubular light source so that light from the source is introduced into the optical cavity, and attaching the flexible sheet to the member such that the sheet retains the tubular source in juxtaposition with the member.

BRIEF DESCRIPTION OF THE DRAWINGS

These and other features of the invention will now be described with reference to the drawings of a preferred embodiment, which are intended to illustrate and not to limit the invention, and in which:

FIG. 2 is a top plan view of the lighting apparatus used to illuminate the watch of FIG. 1;

FIG. 3 is a cross-sectional side view of the lighting apparatus of FIG. 2 taken along the line 3—3;

FIG. 4 is a cross-sectional view of the lighting apparatus of FIG. 2 taken along the line 4—4;

FIG. 4A is an enlarged view of a portion of FIG. 4;

FIG. 4B is a cross-sectional view similar to that of FIG. 4, but with elongate structures on the top surface;

FIG. 4C is a cross-sectional view similar to that of FIG. 4, but with reflective material surrounding the entire waveguide;

FIG. 25 is a perspective view of an exit sign incorporating yet another embodiment of a lighting apparatus;

FIG. 26 is a side view of an exit sign incorporating extractive display elements;

FIG. 27 is a side view of an extractive display element;

FIG. 28 is a side view of an alternative embodiment of an extractive display element;

DETAILED DESCRIPTION OF THE PREFERRED EMBODIMENTS

Figure 1:
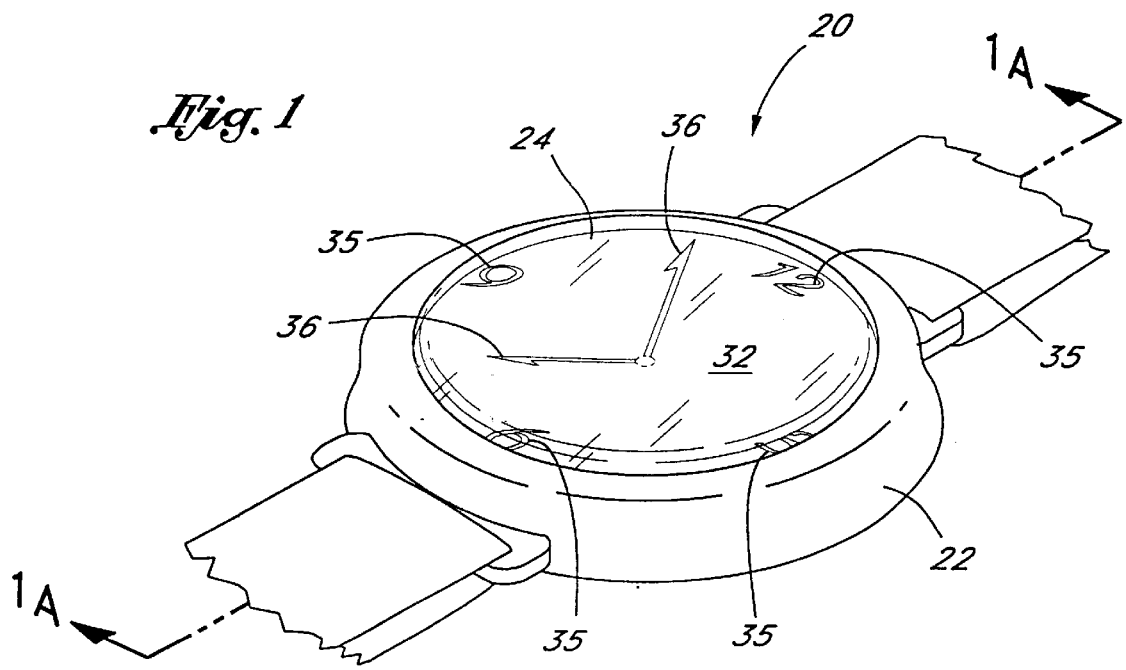
FIG. 1 is a perspective view of wristwatch incorporating one embodiment of a lighting apparatus.
Figure 1A:
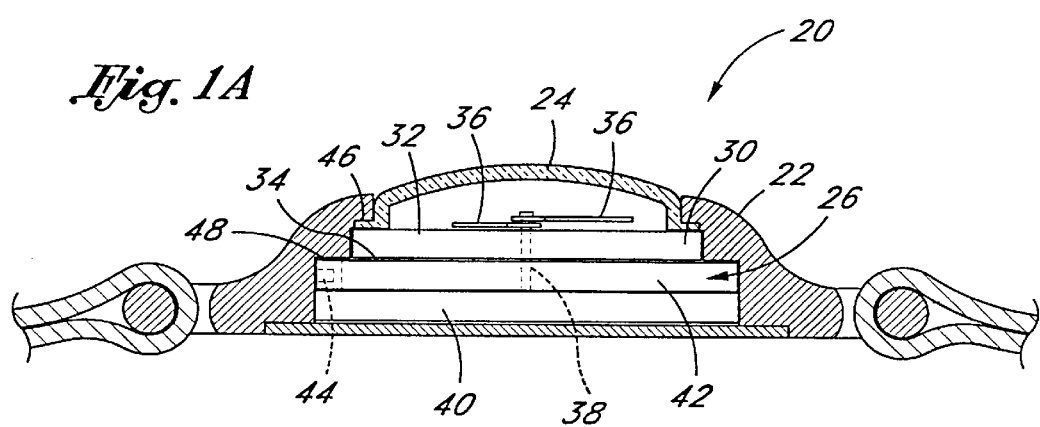
FIG. 1A is a cross-sectional view of the watch of FIG. 1 taken along line 1A—1A.

Referring to FIGS. 1 and 1A, one embodiment of the present invention is utilized as a back lighting apparatus 26 for a wristwatch 20. Although the wristwatch 20 is shown having a generally circular shape, it will be appreciated that the wristwatch may have any of a variety of shapes.

An outer housing 22 of the wristwatch 20 encloses a thin disk 30 of substantially transparent material that is spaced below a watch crystal 24. The disk 30 has an upper display surface 32 and an opposed bottom surface 34. The display surface 32 includes indicia 35 (FIG. 1), such as numerals for indicating time, although other indicia could also be displayed. Two hands 36 of the watch 20 are mounted for rotation about a stem 38 that extends through the disk 30. The stem is driven by a watch mechanism 40 in a well known manner. Alternatively, the disk 30 may comprise a liquid crystal display in which indicia, such as the hands and numerals, are electrically generated.

Referring to FIG. 1A, the lighting apparatus 26 is interposed between the disk 30 and watch mechanism 40 for illuminating the disk 30. The lighting apparatus 26, which is preferably in contact with the disk 30, includes a waveguide 42 and a light source 44 positioned along a peripheral edge of the waveguide 42.

In the illustrated embodiment, the housing 22 supports the disk 30 and the lighting apparatus 26 in juxtaposed relationship to each other. The disk 30 is mounted so that its periphery is supported by a first annular lip 46 which partially covers the display surface 32 to define a viewing area or illumination region of the display surface 32. The waveguide 42, which has a diameter slightly larger than that of the disk 30, is mounted so that its periphery is supported by a second annular lip 48 in the housing 22. The second annular lip 48 is sized to shield the light source 44 from being directly visible through the illumination region of the display surface 32. By way of example, the diameter of the illumination region may be 27 mm.

As shown in FIG. 2, the waveguide 42 has a circular shape optimal for illuminating a circular watch, although other shapes may be utilized for various applications. The light source 44 is mounted within a triangular or V-shaped notch 50 in the peripheral edge of the waveguide 42. The notch 50 serves as an optical diverter which redirects light transmitted by the light source 44, utilizing refractive index differences at the interface 52 formed by the sides of the notch 50. In a preferred embodiment, the V-shaped optical diverter 50 is symmetrical such that a line passing through its apex and the center of the waveguide 42 bisects the V-shaped notch.

In a preferred embodiment, the light source is a single, solid state, point source of light, such as a light emitting diode (LED) 44 mounted on a carrier or circuit board (not shown). The carrier on which the LED 44 is mounted is attached to the waveguide at the back of the notch 50 (i.e., the open end opposite the apex) utilizing an adhesive (not shown). The LED 44, which is typically in the form of a cube of solid state material that emits light from each of multiple faces (i.e., its top surface and four sides), is spaced from the sides of the notch 50 with air therebetween. The difference in index of refraction between the waveguide and the air creates the refractive index interface 52 that causes light to refract as the light passes into the waveguide 42. In accordance with this advantageous feature, a substantial fraction of the light passing through the interface 52 is refracted toward opposite sides of the waveguide 42 (i.e., the sides generally adjacent to and on opposite sides of the light source 44). In this manner, regions of the waveguide 42 that are located to the sides of the light source 44 are efficiently illuminated, and the diverter 50 thereby contributes to uniform illumination.

The waveguide 42 is preferably comprised of a material that is transparent to light produced by the LED 44, such as a transparent polymeric material, and may be manufactured by various well-known methods, such as machining or injection molding. Preferred materials for the waveguide 42 are acrylic, polycarbonate, and silicone. Acrylic, which has an index of refraction of approximately 1.5, is scratch resistant and has a lower cost relative to polycarbonate. Polycarbonate, which has an index of refraction of approximately 1.59, has higher temperature capabilities than acrylic. Polycarbonate also has improved mechanical capabilities over acrylic. Silicone has a refractive index of approximately 1.43. The refractive index of air is 1.0. The dimensions of the waveguide 42 may vary, although the waveguide 42 is desirably very thin relative to its length so as to provide a low profile. The distance between the top surface 56 and the bottom surface 58 is preferably on the order of 1–3 mm, while the diameter of the waveguide 42 is typically at least 2.0 mm.

As shown in FIG. 2, a plurality of display elements comprising elongate structures 54 extend across the waveguide 42 for redirecting light propagating within the waveguide 42. Although illustrated as lines, the elongate structures 54 have a three-dimensional shape, as described in detail below. In the illustrated embodiment, the elongated elongate structures 54 are arranged in a pattern consisting of intersecting lines that extend radially outward from a common point at the center of the waveguide 42 through which the stem 38 passes. The elongate structures 54 are preferably spaced apart by an equal angular distance, such as 0.3 degrees. It has been found that the pattern of radial grooves utilized in the watch 20 are highly effective in eliminating "shadows" that would otherwise be cast by the watch stem 38.

As illustrated in FIG. 3 the waveguide 42 includes a top surface 56 and an opposed bottom surface 58, which are substantially parallel to each other. A side or edge surface 60 extends between the top and bottom surfaces 56, 58 along the periphery of the waveguide 42. While the surfaces 56, 58 are typically flat for backlight applications, the surfaces 56, 58 may also be formed as curved surfaces, such as when the waveguide is utilized as a taillight for an automobile.

A diffusive reflective material 62 is positioned adjacent the bottom surface 58 and side surface 60 of the waveguide 42, with the material 62 also preferably covering a peripheral strip 61 on the top surface 56. In the embodiment illustrated, the peripheral strip 61 is sufficiently wide to cover the notch 50 so that the top, the bottom, and the outside edge of the notch 50 are covered by the reflective material 62. The peripheral strip is also preferably sufficiently wide that the LED 44 cannot be viewed directly from viewing angles of 75 degrees or less (it being understood that the viewing angle is measured from a line normal to the top surface 56). By way of example, the peripheral strip may be equal in width to the width of the second annular lip 48 of the watch 20 (FIG. 1).

The diffusive reflective material 62, which has a reflectivity of at least 88% may comprise a single layer or multiple layers of diffusely reflective tape, such as DRP™ Backlight Reflector, manufactured by W.L. Gore & Associates. DRP™ Backlight Reflector has a reflectivity of approximately 97%–99.5%, depending on its thickness and the wavelength of the light. Alternatively, the reflective material 62 could comprise a paint or coating that is applied to the surfaces 58 and 60, such as white house paint or a more exotic material, such as the Labsphere Corporation's Spectraflect paint. Spectraflect paint's reflectivity is considerably higher than house paint, roughly 98%, while the reflectivity of a good white house paint is approximately 90%.

Because the reflective material 62 covers the bottom and side surfaces 58, 60, as well as the peripheral strip on the top surface 56, light will be emitted from the waveguide in an output illumination region or aperture 65 comprising the central uncovered portion of the top surface 56 (i.e., the portion of the surface 56 interior to the peripheral strip 61). It will be appreciated that light rays incident on the top surface 56 at an angle of incidence (i.e., the angle of the ray relative to a line normal to the surface) at least equal to a critical angle will be totally internally reflected toward the bottom surface 58. That is, the top surface 56 will reflect all of such light back into the waveguide 42. Light rays having an angle of incidence less than the critical angle are transmitted through the top surface 56. The value of the critical angle is dependent on the difference in the indices of refraction between the waveguide 42 and the disk 22, as is known by those skilled in the art. For a waveguide 42 having a refractive index of 1.5, the critical angle is approximately 42° when surrounded by air.

As shown in FIGS. 4 and 4A, the elongate structures 54 may comprise grooves defined by surfaces 64 (FIG. 4A) that form a substantially triangular or V-shaped cross-section. The elongate structures 54 advantageously alter the angle of incidence of light reflected toward the top surface 56 to enhance passage therethrough. That is, the angled surfaces 64 reflect light toward the top surface 56 at an angle of incidence less than the critical angle so that such light passes through the top surface 56 rather than being totally internally reflected. The elongate structures 54 are thus used to "eject". light rays that might otherwise be totally internally reflected by the top surface 56. This advantageously increases the optical efficiency of the waveguide 42 by ejecting light that would otherwise experience energy loss through repeated reflections. The elongate structures are defined by a depth D and an apex angle θ that bisects the V-shaped structure 54. In the preferred embodiment, depth D is in the range of 1–2 micrometers and the angle θ is approximately equal to 45 degrees. Preferably, an air gap is maintained within the V-shaped structure 54 (i.e., the grooves are not filled with reflective material).

The elongate structures 54 are preferably arranged to achieve generally uniform illumination profiles across the illumination output region of the waveguide. In preferred embodiments, the uniformity ratio of the output illumination region, which is defined as the ratio of the highest intensity to lowest illumination within such region is no more than 2 to 1.

Referring to FIG. 4B, in another preferred embodiment, the elongate structures 54 are placed on the top surface 56 instead of the bottom surface 58. The remaining aspects of this embodiment are identical to those of the embodiment shown in FIG. 4.

In an additional embodiment, shown in FIG. 4C, the entire waveguide, including the top surface 56, bottom surface 58, and side surfaces 60 are covered by reflective material 63, which is preferably the same diffusely reflecting type as the material 62, but is partially transmissive and partially reflective. Additionally, the material 63 has a reflectivity that is greater than its transmissivity, that is, the reflectivity is greater than 50% and the transmissivity is less than 50%. In one preferred embodiment, which may be utilized in the watch 20, the reflectivity is about 96% and the transmissivity is about 4%. This embodiment provides an output illumination which is substantially uniform, even without the elongate structures 54, although such structures may still be desirable to reduce shadows from the watch stem 38 (FIG. 1A). This embodiment is also advantageous in that the indica (numerals, etc.) may be applied directly to the reflective material 63, thereby eliminating the need for the display disk 30.

Figure 5:
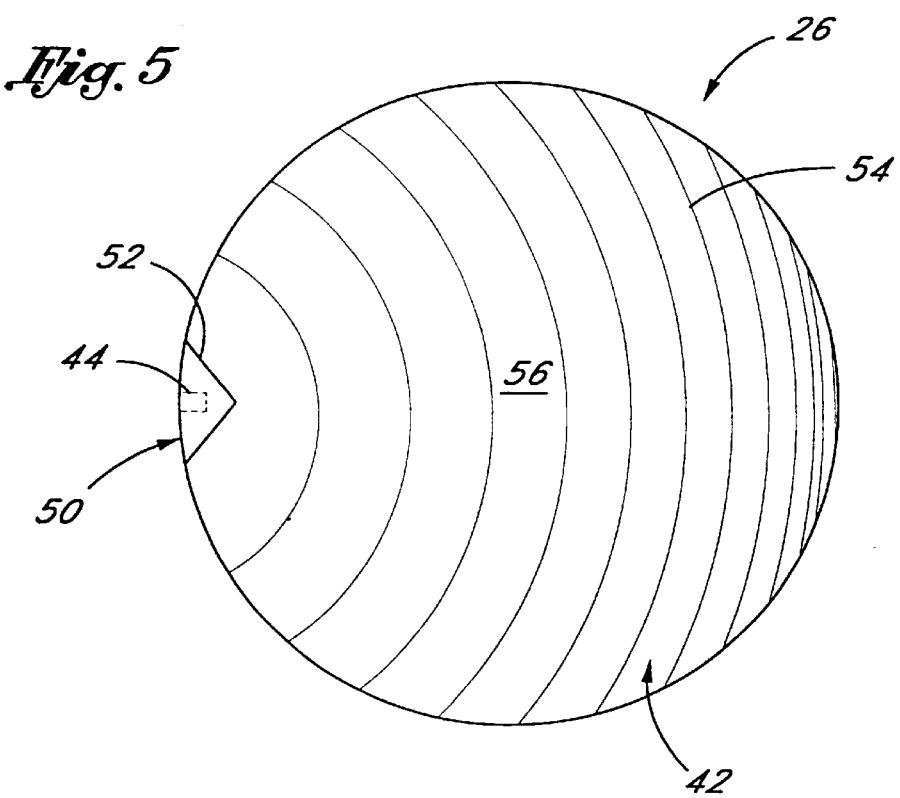
FIG. 5 is a top plan view of an alternative embodiment of a waveguide for use in the lighting apparatus of FIG. 2.

Various types of groove patterns may be utilized as to improve the uniformity of the illumination within the region to be illuminated, depending on the situation. Referring to FIG. 5, the elongate structures 54 may be arranged in a pattern of nonintersecting arcuate lines that are arranged about the light source 44. In a preferred embodiment, the radius of curvature of the arcuate lines increases with distance from the point source 44. Additionally, the centers of the radius of curvature lie along a line passing through the point source and the center of the illumination region of the waveguide, with all such centers lying along such line (on the side of the waveguide that is further from the waveguide center than from the source 44). The arcuate lines are nonuniformly spaced apart to compensate for loss of intensity as the light propagates outwardly from the light source 44. Specifically, the spacing between the elongate structures 54 decreases as the distance from the light source 44 increases so that the density of the elongate structures 54 increases moving away from the light source 44. The increased density of elongate structures 54 desirably increases the ejection of light rays in these areas to compensate for the distance from the source 44.

Figure 6:
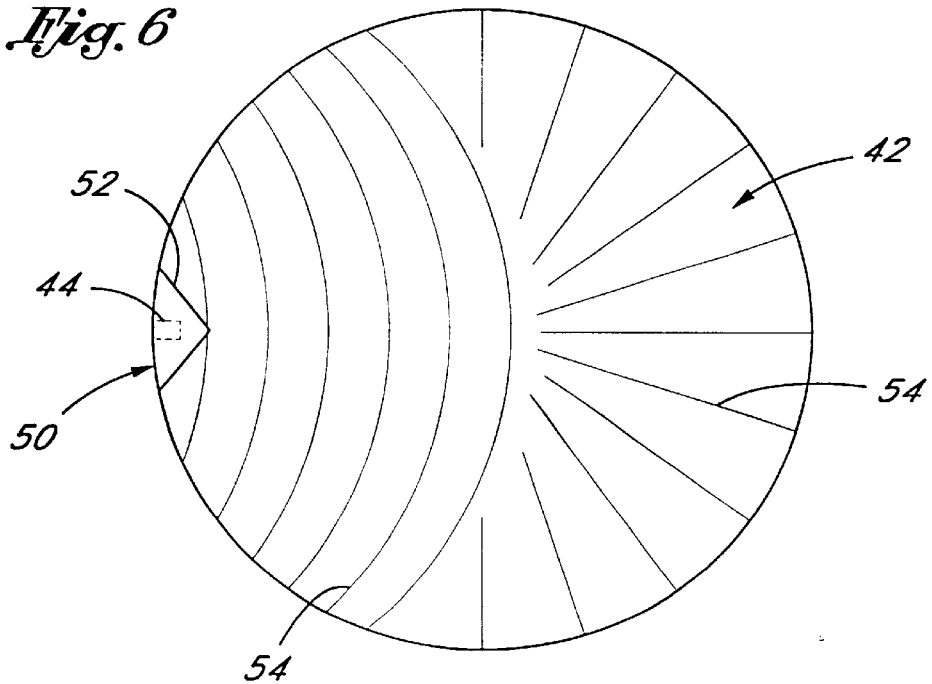
FIG. 6 is a top plan view of yet another embodiment of a waveguide for use in the lighting apparatus of FIG. 2.

As shown in FIG. 6, the elongate structures 54 could also be arranged in a more complex pattern comprised of a combination of simpler patterns. For example, the patterns could take the form of arcuate lines that emanate outward from the light source 44 and straight lines that extend radially outward from the center of the waveguide 42.

Figure 7:
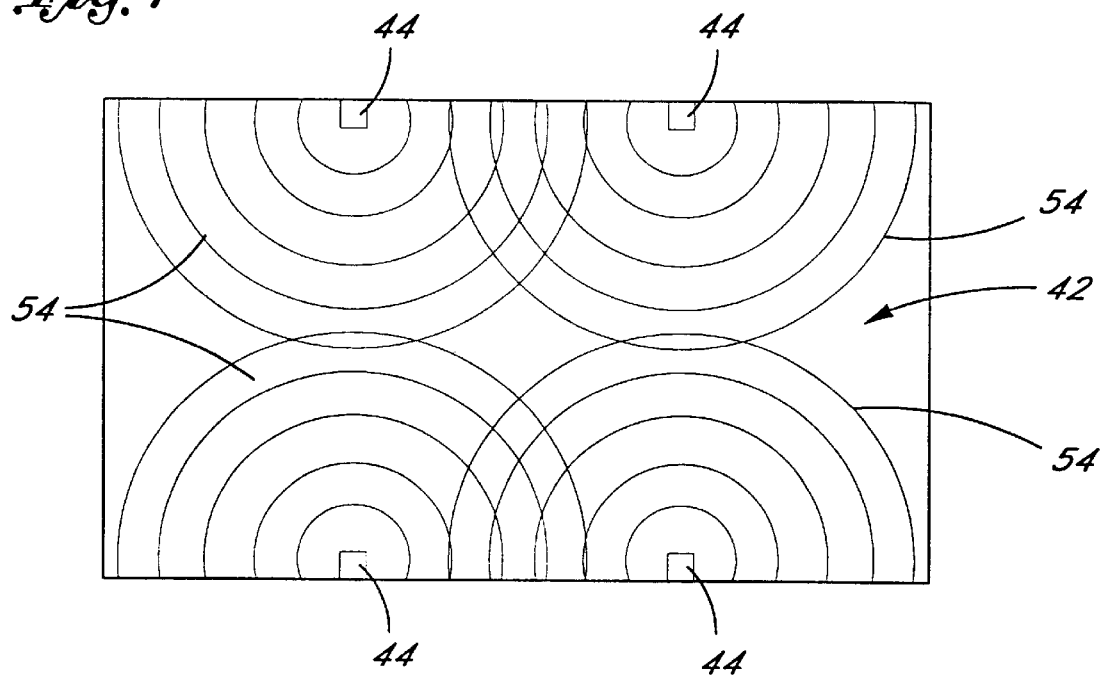
FIG. 7 is a top plan view of yet another embodiment of a waveguide for use in a lighting apparatus.

FIG. 7 shows a rectangular-shaped waveguide 42. Such a waveguide is preferably used to illuminate a rectangular-shaped display, such as on cellular phones or personal digital assistants. Although reflective material is not shown, it will be understood that this embodiment may be constructed in the manner previously described. In the illustrated embodiment, multiple point light sources 44 are coupled to introduce light at spaced peripheral locations along the edge of the waveguide 42. Because multiple sources are employed, optical diverters such as the notch 50 are optional, and may or may not be included. The elongate structures 54 of this embodiment are arranged in concentric arcs around each of the light sources 44, although various other patterns are contemplated, including those discussed above.

Figure 8:
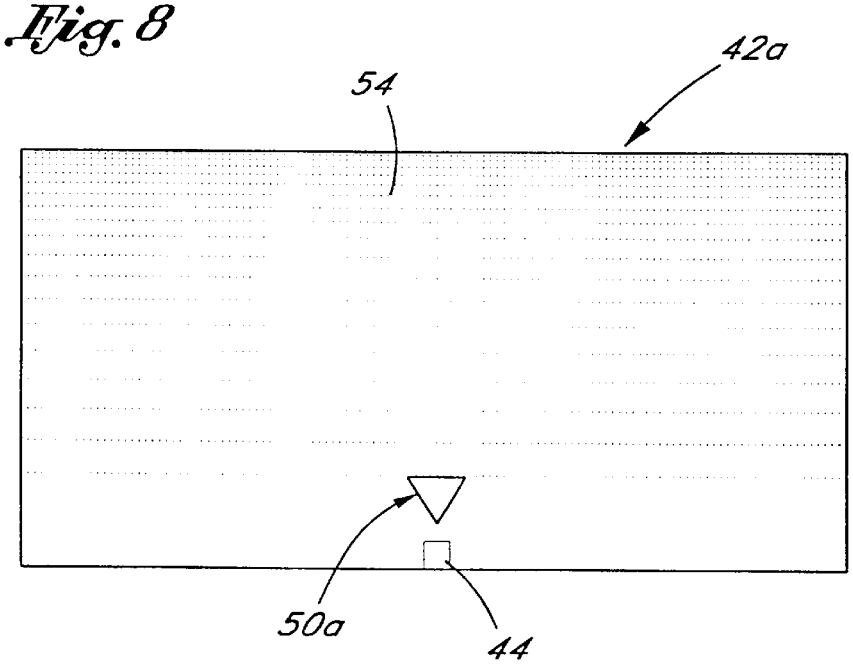
FIG. 8 is a top plan view of a waveguide showing another embodiment of an optical diverter.

FIG. 8 illustrates an alternative embodiment in which elongate structures 54 are formed in a waveguide 42a by scratching a top or bottom surface of the waveguide with an abrasive, such as sandpaper. The abrading is preferably non uniform such that the density of the scratches or grooves increase with distance from the light source 44. By way of specific example, in the rectangular waveguide shown in FIG. 8, the grooves are directed along the length of the rectangle, rather than the width. The groove pattern is generally amorphous on a local basis, but is substantially directional and nonrandom on a global basis.

FIG. 8 also illustrates an alternative embodiment of an optical diverter that is formed by a triangular opening 50a that extends through a waveguide 42a at its periphery. The opening is between the light source 44 and the output illumination region of the waveguide 42, and a line drawn between the source and the center of such region bisects the triangle while passing through its apex. As shown, the triangular opening 50a has two sides which intersect at a location proximate to the light source to form such apex.

The triangular opening 50a is filled with a material, such as air, which has a refractive index significantly different from that of the material of the waveguide 42. The shape of the optical diverter 50a and the refractive index difference cause light emanating from the light source 44 to intersect the optical diverter 50a at an angle of incidence which results in total internal reflection of the light towards opposite sides of the waveguide 42. Thus, the optical diverter 50a, like the notch 50, redirects the path of light rays to regions of the waveguide that are on opposite sides of the light source 44.

Figure 9:
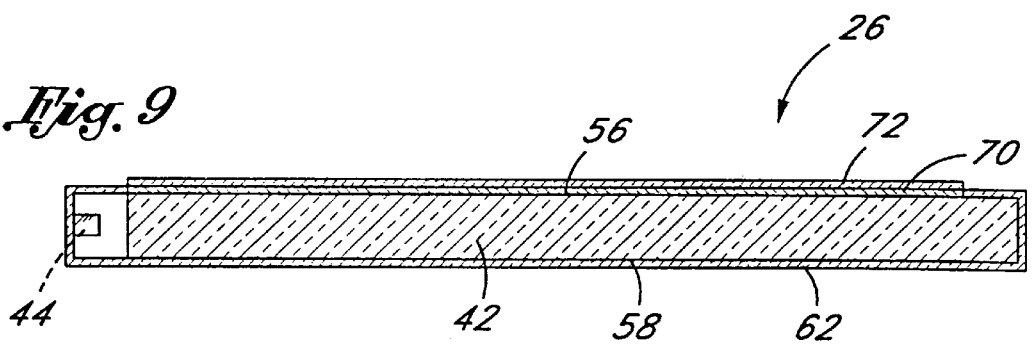
FIG. 9 is a cross-sectional view of a lighting apparatus used with a light enhancing structure.

Referring to FIG. 9, the top surface 56 of the wave guide 42 (or alternative embodiments thereof) may be covered with an angular spectrum restrictor 72 that restricts the output radiation pattern from the output illumination region 65 of the waveguide to a predetermined range of angles (in this context, the term "spectrum" is used in the sense of an angular spectrum rather than a wavelength spectrum). The angular spectrum restrictor 72 comprises a planar microreplicated optical structure, such as a holographic diffuser, binary diffractive diffuser, or array of microlenses. In the preferred embodiment, the angular spectrum restrictor 72 comprises a brightness enhancing film (BEF) which, in addition to restricting the output spectrum, enhances the intensity of the illumination in the output illumination region 65. The BEF 72 is preferably placed in physical contact with a diffuser 70 to collectively form a light quality enhancing apparatus 73. Preferably, the diffuser 70 is disposed between the BEF 72 and the waveguide 42 and in contact with the waveguide 42. The purpose of the diffuser is to remove the effect of residual nonuniformities, such as cosmetic imperfections, in the surfaces of the waveguide 42. The diffuser 70 is comprised of translucent material, typically a thin plastic surface or volume diffuser, both of which are characterized by very low absorption and minimum energy losses.

As mentioned above, the BEF 72 restricts output illumination within defined boundary lines and also increases the brightness within the output illumination region 65. In the preferred embodiment, the BEF 72 is a commercially available thin film having linear pyramidal structures, such as 3M model 90/50 film. The BEF transmits only those light rays from the waveguide that satisfy certain incidence angle criteria with respect to the top surface 56. All other light rays are reflected back into the waveguide 42 toward the bottom or side surfaces 58 and 60, respectively, where they are reflected by the reflective material 62. In effect, the reflected rays are "recycled" until they are incident on the BEF 72 at an angle which permits them to pass through the BEF 72.

As is well known, a BEF, such as the BEF 72, concentrates illumination within boundaries defined by a pair of mutually inclined planes (which in cross-section form a "V") and does not provide concentration in the orthogonal direction. In some applications of the invention, it is preferable to concentrate the illumination two orthogonal directions, and for such applications, a second BEF oriented orthogonally to the first BEF, may be included. With two crossed BEFs, the emission from the waveguide will be within boundaries resembling a truncated inverted cone. As is conventional in the art, the boundaries are defined by the full-width, half-maximum (FWHM) of the optical intensity. By way of example, the boundaries of the cone may be inclined relative to a line normal to the top surface 56 by an angle of no more than about 35 degrees, in which case the illumination will be visible only within viewing angles of 35 degrees or less.

Figure 10:
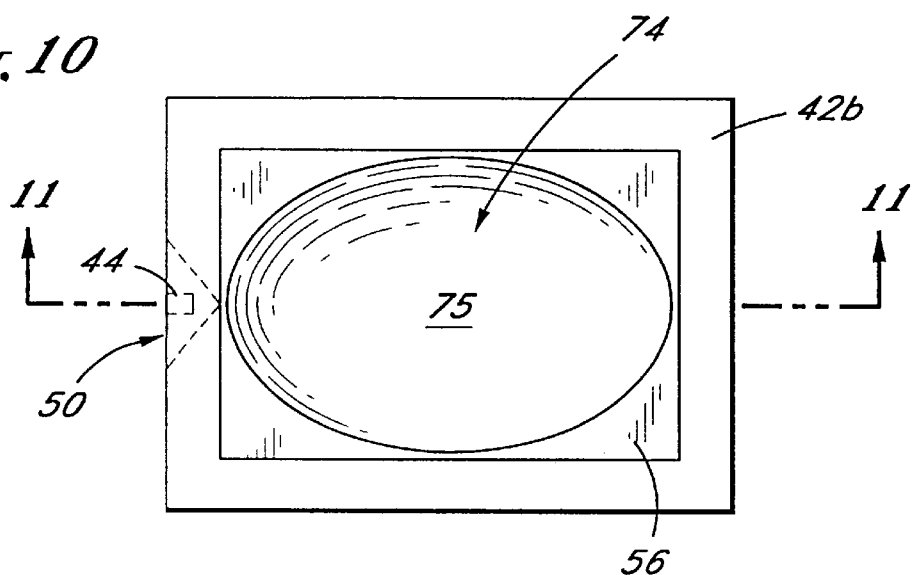
FIG. 10 is a top plan view of a waveguide having a dimple for redirecting light rays.
Figure 11:
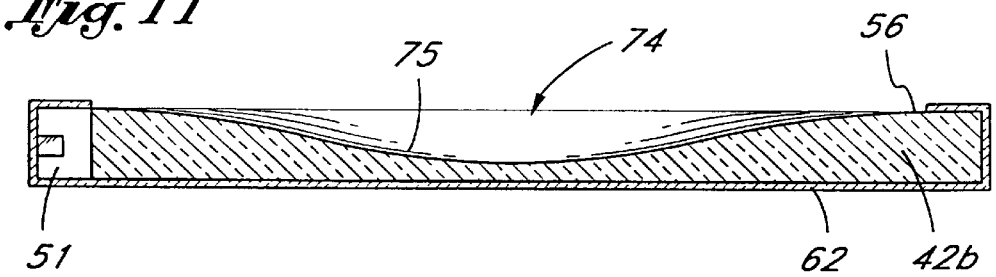
FIG. 11 is a cross-sectional side view of the lighting apparatus of FIG. 10 taken along the line 11—11.
Figure 22:
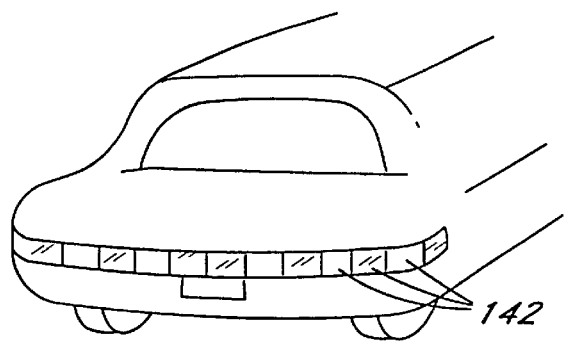
FIG. 22 is a rear perspective view of an automobile having taillights that incorporate a lighting apparatus.

FIGS. 10 and 11 illustrate a top and a cross-sectional side view, respectively, of yet another embodiment of the lighting apparatus 26 that utilizes a waveguide 42b. As shown in FIG. 10, a light source 44 is mounted adjacent an optical diverter 50 and the waveguide 42b is covered with reflective material 62 or 63 in the manner described above with respect to the waveguide 42 shown in FIGS. 2–4C. The top surface 56 of the waveguide 42b includes a depressed region or dimple 74 that redirects light rays propagating in the waveguide 42b, as described below. As best shown in FIG. 22, the dimple 74 comprises a surface 75 of smooth and continuous curvature relative to the bottom surface 58 so as to define an area of reduced thickness of the waveguide 42b. As used herein, the "thickness" of the waveguide 42 refers to the distance between the top surface 56 and the bottom surface 58. In the preferred embodiment, the variation of thickness (e.g., depth of the dimple 74) is at least equal to 5% of the thickness of the waveguide 42 outside the dimple 74.

The dimple 74 is preferably centrally located with respect to the periphery of the waveguide 42, covers an area at least 70% that of the top surface 56, and defines an elliptical shape in a cross-section parallel to the top surface 56. For the rectangular waveguide, shown in FIG. 10, the geometric contour of the dimple 74 defines a super ellipse in accordance with the following equation:

$$(x/a)^n + (y/b)^p = 1$$

where n and p are both greater than 2, a is the length of the major axis of the ellipse, and b is the length of the minor axis of the ellipse. As is well known, increasing the exponents n and p above two causes the shape of the ellipse to become less oval and more rectangular. These exponents are preferably selected so that the curved edges of the dimple 74 extend substantially to the edges of the output illumination region of the waveguide.

According to an advantageous feature of the waveguide 42b, the surface 75 of the dimple 74 follows a geometric contour that redirects light propagating between the top surface 56 and the bottom surface 58, so that the redirected light more readily and uniformly exits the top surface 56 of the waveguide 42b. Specifically, some light will be incident on the curved dimple surface 75 at an angle of incidence which causes it to refract through the top surface 56. Light having an incident angle within the critical range will be totally internally reflected. Reflected light will be directed toward the bottom surface 58 or side surface 28. The reflective material 62 adjacent these surfaces reflects the light toward the top surface 56 for transmission therethrough. Light reflected from the bottom surface 58 in the region of the dimple 74 will typically be incident on the dimple surface 7517-20 at a reduced angle of incidence which permits the light to be transmitted therethrough. Other embodiments may utilize multiple light sources 44 with a single and multiple dimples 74.

Figure 12:
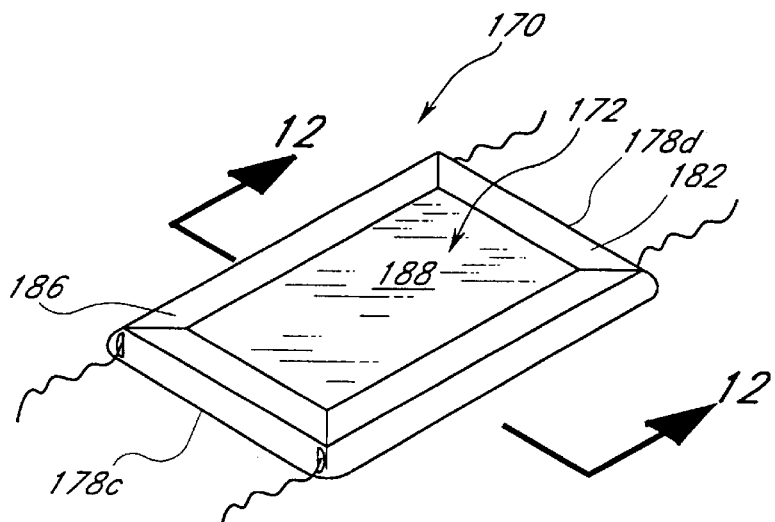
FIG. 12 is a perspective view of an alternate embodiment of a lighting apparatus.
Figure 13:
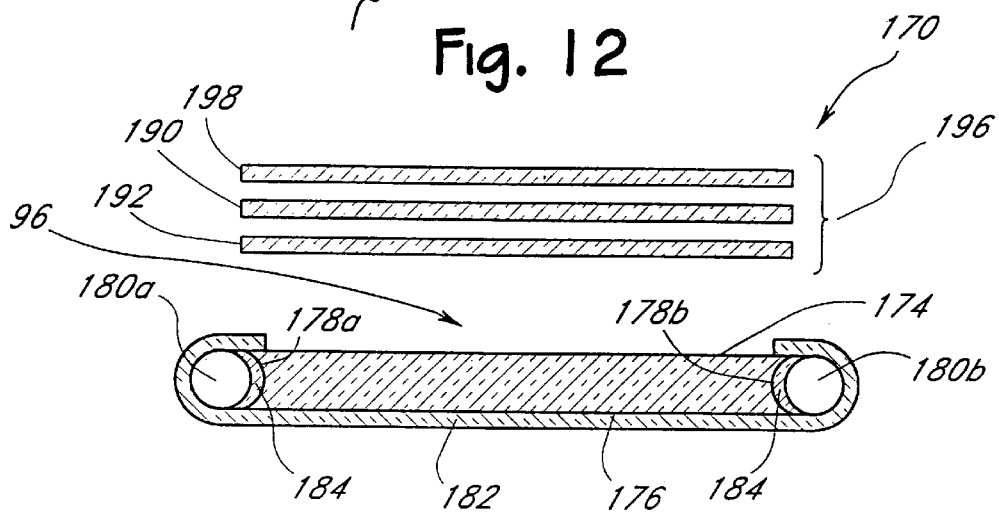
FIG. 13 is a cross-sectional view of the lighting apparatus of FIG. 12.

As shown in FIGS. 12 and 13, another embodiment of the lighting apparatus, referred to as lighting apparatus 170, comprises a rectangular waveguide 172 having a top surface 174 (FIG. 13) and an opposed bottom surface 176 (FIG. 13). Four side surfaces 178a (FIG. 13), 178b (FIG. 13), 178c, and 178d extend between the top surface 174 and bottom surface 176. A pair of lamps 180a, 180b are mounted adjacent the opposing side surfaces 178a and 178b. The lamps 180a, 180b are preferably held in place by diffusive reflective material 182 that surrounds the lamps 180a, 180b and covers a significant portion of the waveguide 172, as described more fully below.

The lamps 180 preferably comprise fluorescent tubes of circular cross-section which extend along substantially the entire length of the sides 178a, 178b. As best shown in FIG. 13, the sides 178a and 178b of the waveguide 172 are preferably each concave to form respective elongate channels that extend along the entire length of the sides 178a, 178b. Such channels are configured to flushly receive respective surfaces on sides of the lamps 180a, 180b. An optical coupling gel 184 is interposed between the lamps 180a, 180b and the sides 178a, 178b of the waveguide 172 in order to reduce repetitive index differences by eliminating air gaps therebetween and thereby efficiently couple light from the lamps 180a, 180b to the waveguide 172. Alternatively, the lamps 180a, 180b may each comprise a linear array of point sources, such as LEDs (not shown).

In the preferred embodiment, the reflective material 182 entirely covers the bottom surface 176 and wraps around the lamps 180a, 180b to secure and retain them in juxtaposition with the side surfaces 178a, 178b of the waveguide 172. The reflective material 182 also wraps around the sides 178c, 178d and extends onto a portion of the top surface 174 so as to form a peripheral strip 186 (FIG. 12) that extends around the perimeter of the top surface 174.

Accordingly, the interior surface of the reflective material creates an optical cavity that is filled by the solid waveguide 172 and lamps 180. The portion of the top surface 174 of the waveguide 172 that is not covered by reflective material 182 forms an illumination output region or aperture 188 through which light is output from the waveguide 172. The peripheral strip 186 is sufficiently wide to shield the lamps 180 from being viewed directly through the aperture 188. In the illustrated embodiment, the aperture 188 has a rectangular shape. It will be appreciated that the aperture 188 could also be circular or take on any other of a wide variety of shapes suited for various applications.

An angular spectrum restrictor 190, such as described above in connection with FIG. 9, may be juxtaposed with the aperture 188. In a preferred embodiment, the angular spectrum restrictor comprises a brightness enhancing film (BEF) 190, as described above, utilized with a diffuser 192 to collectively form a light quality enhancing (LQE) apparatus 196. A color filter 198 may be added to the LQE apparatus 196, if desired. In one embodiment, the edges of the LQE apparatus 196 are interposed between the waveguide upper surface 174 and the peripheral strip 186 of the reflective material 182 so that the reflective material 182 secures the LQE apparatus 196 to the waveguide 172. Alternately, the LQE apparatus 196 may be positioned over the reflective material 182 and secured using an adhesive.

The waveguide 172, lamps 180, reflective material 182, and LQE form a lighting assembly that may be used as a downlight or a backlight. The reflective material 182 reflects light from the lamps 180a, 180b towards the waveguide 172 so that substantially all of the light is coupled into the waveguide 172 through sides 178a, 178b and the optical gel 184. The light undergoes diffuse reflections within the waveguide 172 before exiting from the waveguide 172 through the aperture 188. In particular, the light reflects against the diffusive reflective material 182 that covers the bottom surface 176, surrounds the side surfaces 178a–178d, and covers the peripheral strip 186.

In the lighting apparatus 170, pertinent design factors include the area of the illumination aperture 188, and the combined cavity area, that is the sum of (i) the surface area of the optical cavity and (ii) the area of the aperture 188. For reasonably efficient use of the energy emitted from the lamps 180a, 180b the ratio of the area of the aperture 188 to the combined cavity area is preferably at least 0.20, and in one preferred embodiment the ratio is at least 0.40.

Another parameter of interest is the edge-to-edge dimension of the aperture 188, particularly the dimension referred to herein as the bisector dimension. This bisector dimension is an edge to edge dimension that extends between opposing sides of the aperture 188, along a line passing through the geometric center of the aperture 188, and substantially perpendicular to the aperture edges at such opposing sides (or a tangent thereto in the case of a circular aperture). In one embodiment, all of the edge-to-edge bisector dimensions of the output region are at least 4 inches in length. The ratio of the depth of the cavity to the edge to edge bisector dimensions affects both the intensity and uniformity of the light emanating from the opening formed by the aperture 188. In one preferred embodiment of the present invention, the ratio of the depth of the cavity to any of the edge to edge bisector dimensions is significantly less than 0.1, and preferably no more than 0.08. In another embodiment, only the longest bisector dimension satisfies these ratios. In yet another embodiment, the ratio is no more than 0.03.

The waveguide 172 is comprised of material that is transparent to light produced by the lamps 180a, 180b, such as a transparent polymeric material, and may be manufactured by various well-known methods, such as machining or injection molding. Preferred materials for the waveguide 172 are acrylic, polycarbonate, and silicone.

As mentioned above in connection with the previous embodiments, the reflective material 182 has a reflectivity of at least 90% and may comprise a single layer or multiple layers of diffusely reflective tape, such as DRP™ Backlight Reflector, manufactured by W.L. Gore & Associates. Alternately, the surfaces of the waveguide 172 may be coated with a reflective paint of the type described above.

The light emerging through the aperture 188 of the lighting apparatus 170 may be used to illuminate a display or to provide illumination for a room. In a preferred embodiment, the lighting apparatus 170 is used as a ceiling light fixture. By way of example, when used as a light fixture for a room, the waveguide 172 may be approximately 16"×4" and approximately 6 mm thick. The diameter of the lamps 180 preferably match the thickness of the waveguide 172.

Figure 14:
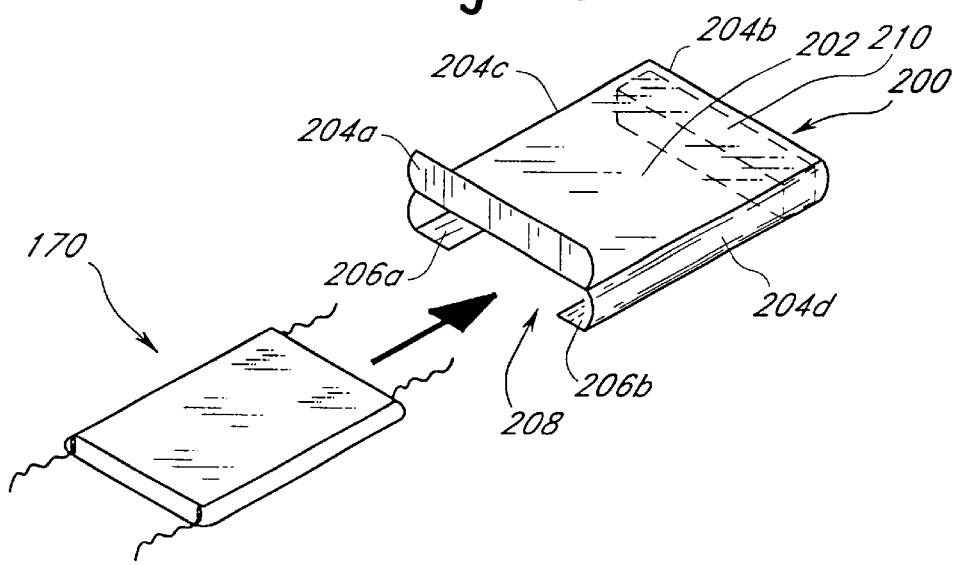
FIG. 14 is a perspective view of a housing used with the lighting apparatus of FIG. 12.

Referring to FIG. 14, the lighting apparatus 170 may include a hollow housing 200 comprising a planar upper portion 202, side portions 204*a*–204*d*, and bottom portions 206*a* and 206*b* that together define a hollow space sized to receive the lighting assembly. The side portion 204*a* is pivotably mounted to one edge of the upper portion 202, thereby allowing it to be opened so that the lighting assembly may be slid into the hollow space within the housing 200. Rails may be positioned on the side portions 204*b* and 204*c* to facilitate insertion of the lighting assembly into the housing 200.

As shown in FIG. 14, the bottom portions 206*a* and 206*d* define an opening 208 therebetween that is at least as large as the aperture 188. The lighting assembly is positioned within the housing 200 so that the illumination aperture 188 of the waveguide 172 is juxtaposed with the opening 208 in the housing 200. Power may be supplied to the lamps 180 in any known manner, such as through an electrical ballast 210 positioned in the housing 200 and connected to the lamps via electrical wires. When the lighting apparatus is illuminated, light emerges from the waveguide 172 through the aperture 188 and into the room.

Figure 15:
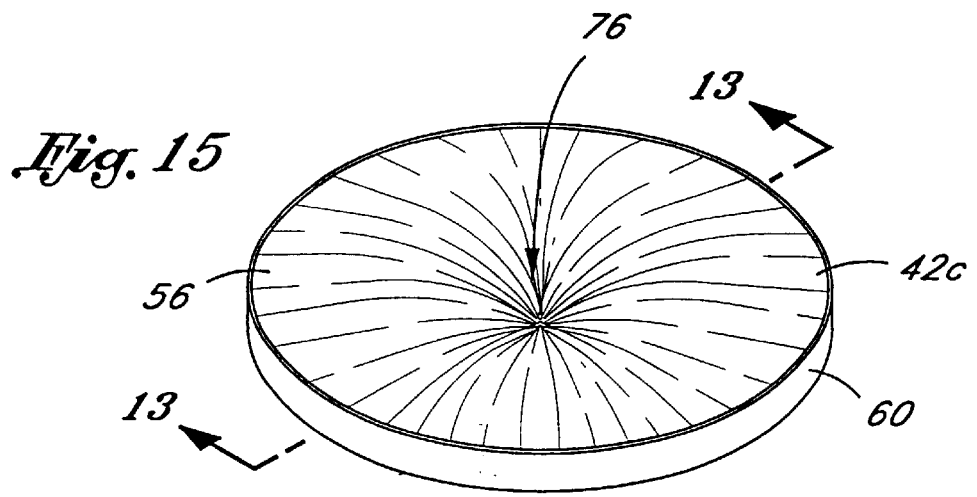
FIG. 15 is a perspective view of a lighting apparatus including a total internal reflection region.
Figure 16:
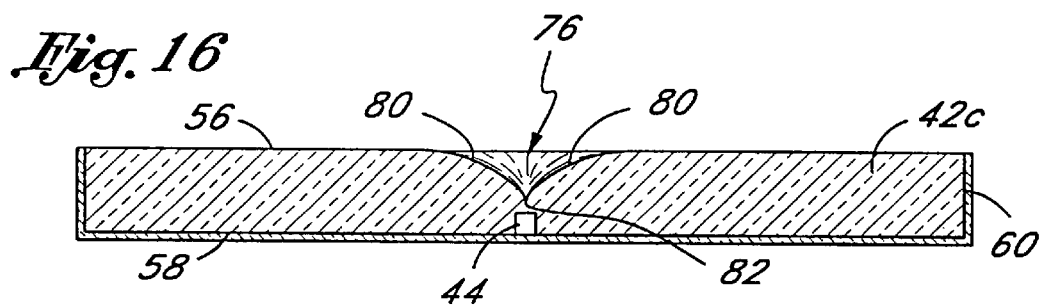
FIG. 16 is cross-section view of the lighting apparatus of FIG. 15 taken along the line 16—16.
Figure 16A:
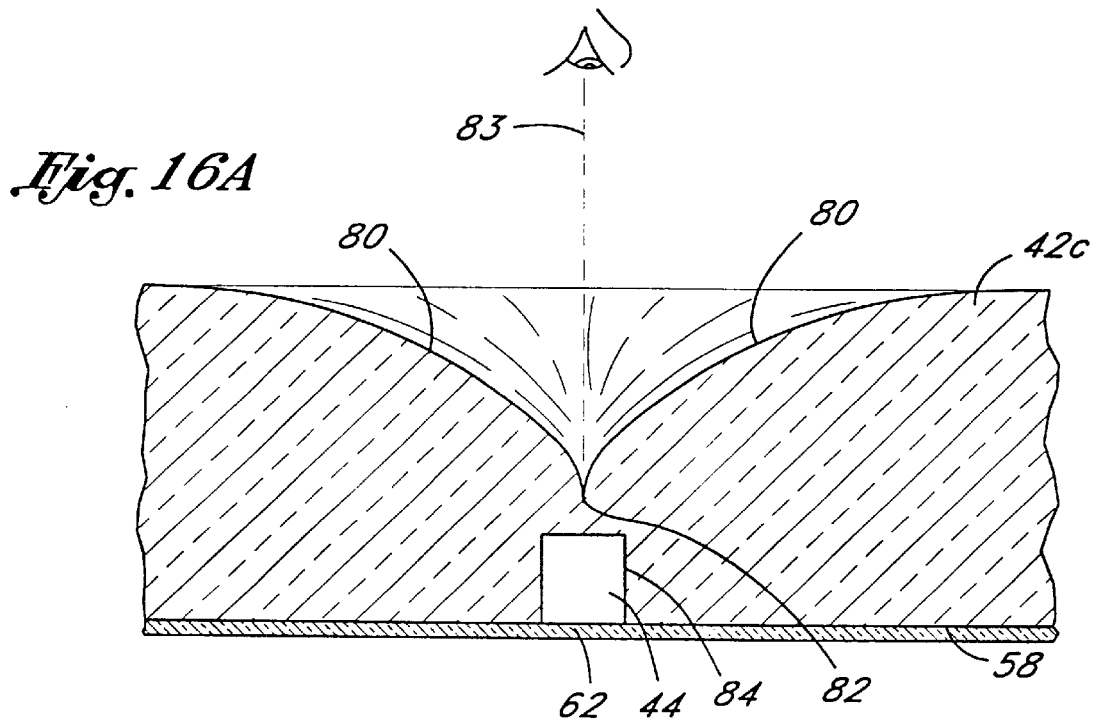
FIG. 16A is an enlarged view of a portion of FIG. 16.

FIGS. 15 and 16 illustrate yet another embodiment of a lighting apparatus utilizing a waveguide 42*c*. As best shown in FIG. 15, the top surface of the waveguide 42 includes a total internal reflection (TIR) region 76 having a smoothly curved surface 80 (FIGS. 16 and 16A) defining a vortex shape that extends into the waveguide 42. Preferably, the region 76 has the shape of an equiangular spiral that forms into a cusp 82. Referring to FIGS. 16 and 16A, the surface 80 has a curved shape that is symmetrical about a vertical axis 83 that extends through the cusp 82 and perpendicular to the top surface 56. A light source 44, preferably an LED, is mounted immediately below the cusp 82. The LED 44 is embedded in a correspondingly-shaped hole, channel, or recess 84 that extends into the bottom surface 58 of the waveguide 42*c*. In order to ensure good coupling into the waveguide 42*c* and reduce reflections at the interface between facets of the LED and corresponding sides of the recess 84, a transparent optical coupling agent, such as an adhesive or gel (not shown), may be used to fill any air gaps between the LED 44 and the waveguide 42*a*. The transparent optical coupling agent could be an epoxy, silicone, or any well-known organic or inorganic optical coupling materials. Preferably, the refractive index of the coupling agent is between that of the LED 44 and waveguide 42.

The surface 80 may be either a nonplanar, curved surface, or a nonplanar surface comprising of a plurality of flat surfaces approximating a curve that produces total internal reflection (TIR). As mentioned, the shape of the surface 80 is preferably a symmetric section of an equiangular spiral. However, other geometric shapes can be used to produce total internal reflection including symmetric sections of hyperbolae, parabolas, sine curves and circles, provided that such shapes are analytically shown to produce total internal reflection, as described below. Mathematical modelling of these shapes can be performed with an optical analysis software package such as ASAP by Breault Research of Tucson, Arizona. However, various parameters such as the waveguide thickness and the shape of the surface 80 must be optimized to optimize the coupling of light into the waveguide 42*c*.

The geometric contour of the surface 80 is selected so that the TIR cusp region 76 formed thereby totally internally reflects substantially all light rays directly emitted by the light source 44. Toward this end, the surface 80 is contoured such that substantially all light rays emitted from the light source 44 are incident on the surface 80 at an angle at least equal to the critical angle. This may be accomplished by calculating the range of possible incidence angles of light rays from the light source 44 at various local areas of the surface 86. The local areas are then oriented so that all rays are incident within the critical range. The local areas could be large in size so that the surface 80 consists of a collection of flat surfaces. As the size of the local areas decreases, the surface 80 forms into a smoothly curved surface having an equiangular spiral shape as shown in FIGS. 16 and 16A.

In the embodiment illustrated, the bottom surface 58, side surfaces 60, and the back of the LED are covered by the diffusive reflective material 62. When the light source 44 is energized, the light totally internally reflected from the surface 30 propagates within the waveguide 42 outside of the TIR cusp region 76. The reflective material 62 functions in the manner described with reference to the waveguide 42. This embodiment is particularly advantageous when the waveguide is utilized as a tail light lens for an automobile. It is contemplated that multiple TIR cusp regions 76 could be positioned on a waveguide 42C, and thus the total combined area of illumination may be quite large.

Figure 17:
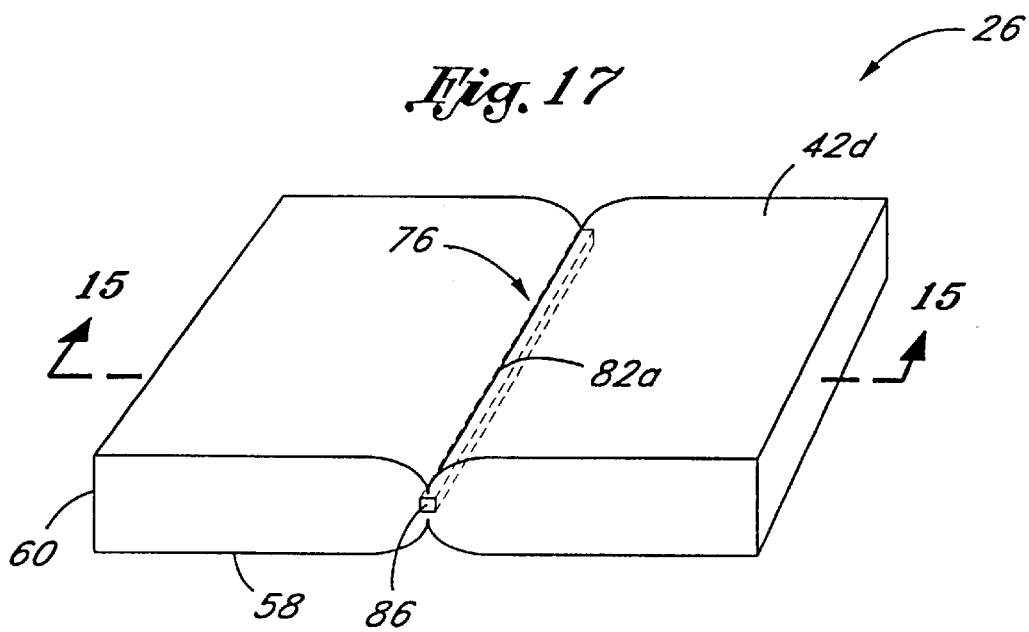
FIG. 17 is a perspective view of an alternative embodiment of a lighting apparatus including a total internal reflection region.
Figure 18:
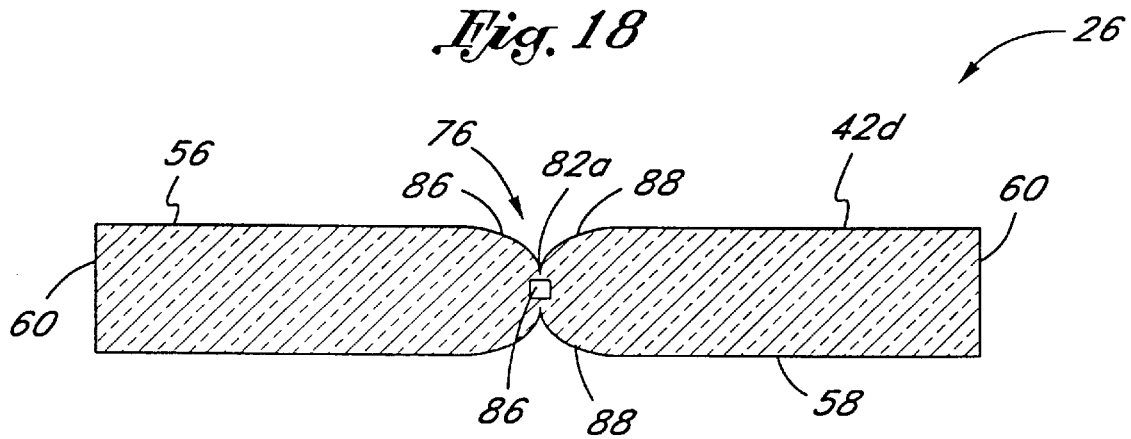
FIG. 18 is a cross-sectional view of the lighting apparatus of FIG. 17 taken along the line 18—18.

FIGS. 17 and 18 illustrate an alternative embodiment of the TIR cusp region 76 used in a waveguide 42*d*. Referring to FIG. 17, the TIR region 76 is elongated so as to define an elongated cusp 82*a* that extends along an axis 83. The TIR region 76 comprises top and bottom equiangular spiral curved surfaces 86, 88 (FIG. 18) that symmetrically extend from either side of the elongated cusp 82*a*. In the illustrated embodiment, a TIR region 76 is located on both the top surface 56 and the bottom surface 58, although the TIR region could also be located on a single surface.

A light source 86 is mounted immediately below the elongated cusp 82. The light source 86 may consist of a single elongated light source that extends along the entire length of the cusp 82, such as a fluorescent tube. Alternatively, the light source 86 may consist of a plurality of point light sources, such as LEDs, that form a line aligned immediately below the length of the cusp 82. The tip of the elongated cusp 82 may be rounded to provide controlled leakage of light from the light source 86 in the area of the waveguide 42*d* immediately above the light source 86. This will eliminate dark spots above the light source 86.

The waveguide 42*d* shown in FIGS. 17 and 18 functions in essentially the same manner as the waveguide shown in FIGS. 12–13. That is, the TIR region 76 totally internally reflects substantially all light emitted by the light source 86. The symmetric pair of curved surfaces 86, 88 joined at the elongated cusp 82*a* provide total internal reflection (TIR) of the light from the light source 44 along either side of the axis 83. The cusp 82*a* divides the light from the light source 44 into two equal portions.

Because the TIR cusp regions 76 of FIGS. 15–18 reflect substantially all light incident thereon, these regions 76 will appear dark relative to portions of the waveguide outside the TIR regions 76. In situations where such dark spots are objectionable, the surface 80 should be contoured to be a less than perfect internal reflector so that a significant portion of the incident light leaks through the surface 80. The amount of leakage should preferably be no more than is necessary to substantially eliminate the dark spots, and provide an intensity in the TIR regions substantially equal to that of the surrounding region. Such leaky TIR regions thus provide substantially uniform output illumination across the entire output region of the waveguide.

LEDs have many desirable properties for optical display systems, including low cost and low driving voltage. LEDs are capable of producing various colors, such as red, green and blue. The driving voltage of an LED may vary from 1.8 volts to 4.0 volts, and the differential energy levels of the quantum mechanical bandgap produces these spectral colors. However, those skilled in the art will appreciate that other point sources may be used. Laser diodes (Lds) or superluminescent light emitting diodes could be used, as well as any semiconductor light emitting device.

Figure 19:
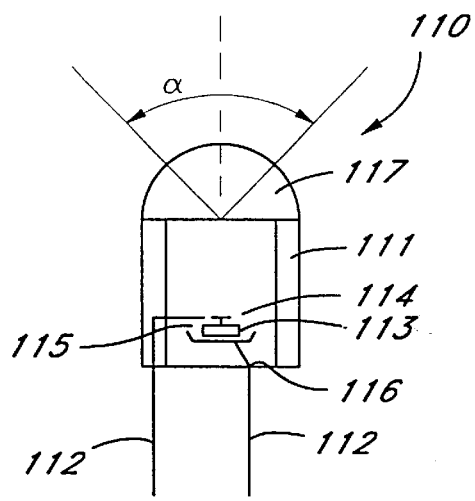
FIG. 19 is a schematic side view of a prior art "bullet lens" LED.

FIG. 19 shows a conventional prior art LED 110 in a "bullet lens" package. The LED 110 includes a housing 111 that encloses two electrical leads 112 connected to an anode 113 and a cathode 114. A layer 115 of Group HI-V semiconductor compound, such as AlGaAs, GaAsP, or AlInGaP, is interposed between the anode 113 and cathode 114. A cup-shaped reflector 116 is positioned behind the semiconductor layer 115. The top portion of the housing 111 forms a hemispherical immersion lens 117 made of an acrylic or an epoxy.

When a voltage in the range of 1.8–4.0 V is applied between the anode 113 and cathode 114, the LED produces visible light energy according to the photoelectric effect. The reflector 116 reflects the light in an upward direction so that the light does not pass through the sides of the housing 111. The lens 117 focuses the light emitted by the semiconductor layer 115. The semiconductor material has a refractive index of approximately 3.4 and the index of refraction of the plastic package of the housing 6 is 1.5.

Figure 20:
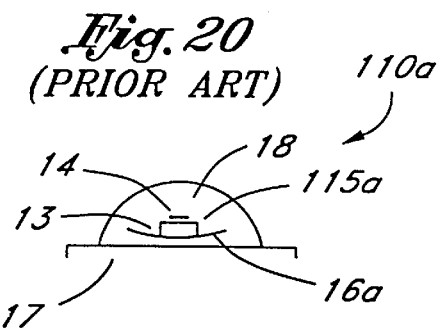
FIG. 20 is a schematic side view of a prior art "bare" LED.

FIG. 20 shows a conventional prior art "bare" light emitting diode 110a. The LED 110a includes a semiconductor layer 115a positioned on a flat base 117. A dielectric dome 118 covers the semiconductor layer 115. A reflector 116a is positioned between the base 117 and the semiconductor layer 115.

Figure 21:
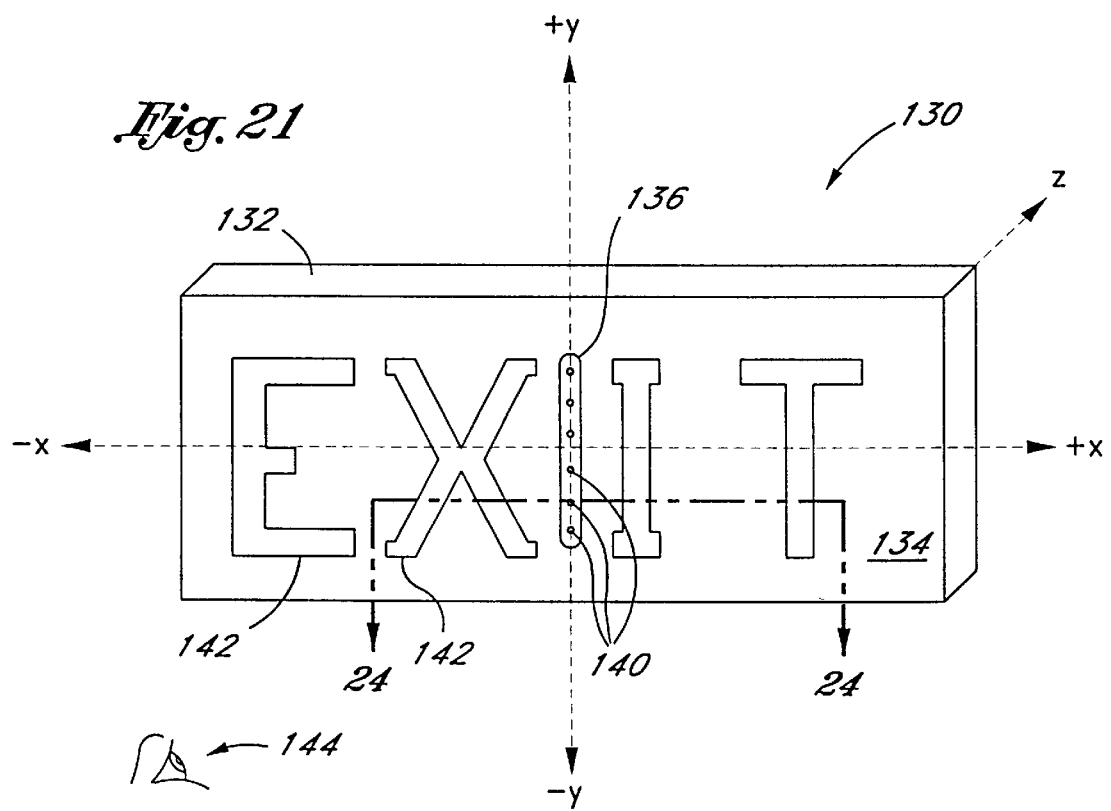
FIG. 21 is a perspective view of an exit sign incorporating an alternative embodiment of a lighting apparatus.

FIG. 21 shows an exit sign 130 illuminated in accordance with another embodiment of the invention. The exit sign 130 consists of a planar waveguiding layer or waveguide 132 having a surface 134 on which an illumination coupling element 136 is centrally located. The illumination coupling element 136 produces and couples illumination from LEDs 140 into the waveguide 132. A plurality of display elements 142 are also located on the surface 134 for coupling the light from the waveguide 132 to an external viewer 144.

Figure 23:
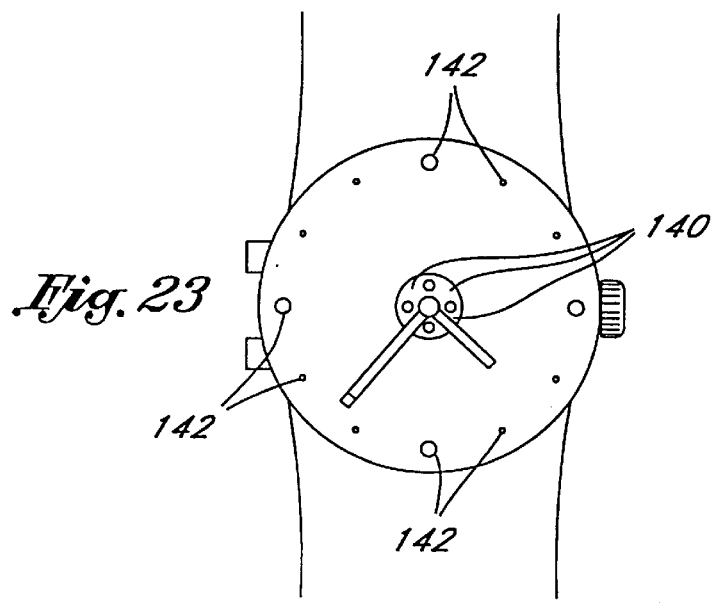
FIG. 23 is a top view of a wrist watch incorporating an alternative embodiment of a lighting apparatus.

Referring to FIG. 21, the display elements 142 have shapes that form the letters "E", "X", "I", and "T", although the display elements may form any of a wide variety of symbols and shapes for illumination. For instance, for illuminating a tail light (FIG. 22), the display elements 142 might be in the form of elongate structures, such as horizontal or vertical lines or channels in the tail light surface. In an alternative embodiment for illuminating a watch or clock face (FIG. 23), the display elements 142 might be in the form of numbers or dots on the dial. For a watch using display elements 142, a single LED could be located in the interior region of a circular waveguide on the watch face. Alternatively, four LEDs could be located in the interior of the watch face, with each LED illuminating one quadrant of the watch face, such as shown in FIG. 23. Additionally, the LEDs could be arranged in a circular array with equiangular spacing.

Figure 24:
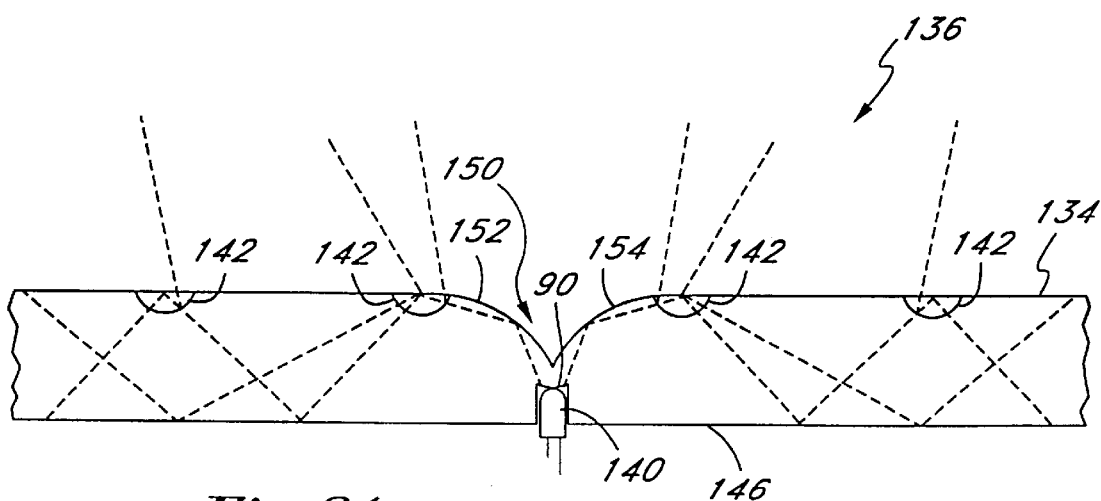
FIG. 24 is a cross-sectional side view of the exit sign of FIG. 21 taken along the line 24—24.

FIG. 24 illustrates a cross-sectional view of the waveguide 132. As shown, the display elements 142 are concave structures that extend into the surface 134. The display elements 142 could also be convex structures. The surfaces of the display elements 142 may either be smooth surfaces or rough surfaces to increase optical diffusion.

As shown in FIG. 24, the illumination coupling element 136 includes one or more LEDs 140 that are embedded in a bottom surface 146 of the waveguide 132. The LEDs 20 are preferably oriented with their longitudinal axes normal to the bottom surface 146 of the waveguide 132. The LEDs 140 may be embedded in either surface 142 or 146 of the waveguide 132, but are preferably embedded in surface opposite location of the display elements 142. The LEDs 140 could consist of either "bullet lens" LEDs or "bare" LEDs.

As shown in FIG. 24, the illumination coupling element 136 comprises a TIR region 150 having curvilinear surfaces 152, 154 similar to surfaces 86 and 88 described above with respect to FIGS. 14 and 15. The surfaces 86 and 88 curve toward the LED 140 to receive impingement of light from the LED 140. The surfaces 86 and 88 are TIR surfaces with respect to such impingement of light. As shown, the surfaces 86, 88 form a cusp directed toward the LED 140 with the LED 140 having an end terminating in alignment with the cusp to direct substantially all light from the LED directly toward and adjacent the cusp. The TIR region operates in substantially the same manner described above and therefore no further description is provided.

The illumination coupling element 136 desirably includes a lens element 90 that is integrally formed with the surface of the waveguide that is adjacent to the LED 140. The optical power of the lens element 90 is caused by a refractive index differential between an air gap surrounding the LED 140, the LED 140, the transparent optical coupling agent, and the waveguide 132. In this embodiment of the waveguide 132, the transparent optical coupling agent and the material of the LED 140 preferably all have an index of refraction of about 1.5. An air gap around the LED 140 defines a volume with a refractive index of about 1.0 to cause refraction of light.

The lens element 90 may optionally be either convex or concave. A convex lens element 90 converges light from the LED 140 to reduce the angular extent of the light radiation from the LED 140. In one embodiment, the focal power of convex lens element 90 is sufficient to collimate the light rays. A concave lens element 90 diverges light rays emanating from the LED 140 to increase the angle of the light rays on the surfaces 152 and 154. This increases the likelihood of light rays intersecting the surfaces 152 and 154 at an angle of incidence greater than the critical angle.

FIG. 25 illustrates another embodiment of an exit sign 130 generally comprising a waveguide 132a. In this embodiment, LEDs 140 are positioned facing outwardly within a circular coupling element 148 located in an interior light injection region of the waveguide 132a. The longitudinal axes of the LEDs 140 are desirably oriented parallel to the plane of the surface 134. Although FIG. 25 shows four LEDs 140 separated by 90° angles in the coupling element 148, it will be appreciated that any number of LEDs 140 can be arranged around the perimeter of the coupling element 148. The LEDs 140 may also be arranged in shapes other than circles, with the longitudinal axes preferably aligned parallel to the waveguide 132a, such as, for example, ovoid, rectangular, square, and linear shapes.

The coupling element 148 may either be integrally formed with the waveguide 132a or it may be modularly inserted into a corresponding hole or recess in the waveguide 132a so that light is injected through the sides of the hole and perpendicular thereto. For a modular configuration, LEDs 140 are desirably first mounted onto the coupling element 148 and then the coupling element 148 is inserted into the hole or recess in the waveguide. A modular insertion technique provides advantages in manufacturing by making it easier to manipulate a plurality of light emitting diodes (LEDs) simultaneously. If the coupling element 148 is integrally formed in the waveguide 132a, the LEDs 140 are inserted directly into the hole or recess in the waveguide. In one possible application 'bare' LEDs may be grown directly on the surface of the waveguide.

In another embodiment shown in FIG. 26, extractive display elements 300 are used in combination with a sign 130 comprising a waveguide 132c. An illumination coupling element 136 is used to inject light into the waveguide 132 in the manner described above. A plurality of extractive display element 300 and waveguiding cylinders 302 are patterned into the surface of the waveguide 132c, as described below. The extractive display elements 300 appear as a series of pointed bumps that are arranged in the shape of symbolic or nonsymbolic figures. Upon illumination through the waveguide 132c and the waveguiding cylinders 302, and in combination with illumination couplers, such as a TIR region described above, the extractive display elements 300 produce a particularly bright, point-like (or line-like) light pattern at the apexes (or vertexes) of the solid polygons.

FIG. 27 shows a side view of an extractive display element 300 formed on the end of a waveguiding cylinder 302. The base of the extractive display element 300 is integral with the end of the waveguiding cylinder 302. Preferably, each of the waveguiding cylinders 302 has a diameter on the order of one-tenth of one inch (0.1"), although the diameter of a cylinder may be as small as on the order of one-thousandth of an inch (0.001").

In the embodiment shown in FIG. 27, the extractive display element 300 is in the shape of a polygonal solid having three equilateral faces 304, 306, 308, and an apex 310 with 120 degree vertices. The number of faces on the extractive display element 300 is not limited to three, and could be any number from two or more. A two-sided extractive display element 300 would be a wedge shape at the end of the cylinder, appearing much like the tip of a screwdriver. A greater number of faces on the extractive display element 300 could include rectangular, hexagonal, octagonal, and circular shapes. In the case of a circular extractive display element 300, the cylinder preferably tapers to a conical tip. Any other wide variety of shapes, such as cross or star shapes, are also contemplated.

The shape of the extractive display element 300 produces a particularly bright, point-like (or line-like) light output at the apex (or vertex) 310. Light is transmitted by total internal reflection within the waveguiding cylinder 302 until it enters the waveguide cylinder 302 and extractive display element 300 through lateral portion 312. Light within the extractive display element 300 is confined within the equilateral faces 304, 306, 308 by total internal reflection until it comes within the vicinity of apex 310. Light is then efficiently coupled out of the display element 300 as a bright, point-like (or line-like) output by apex (or vertex) 310.

Figure 29:
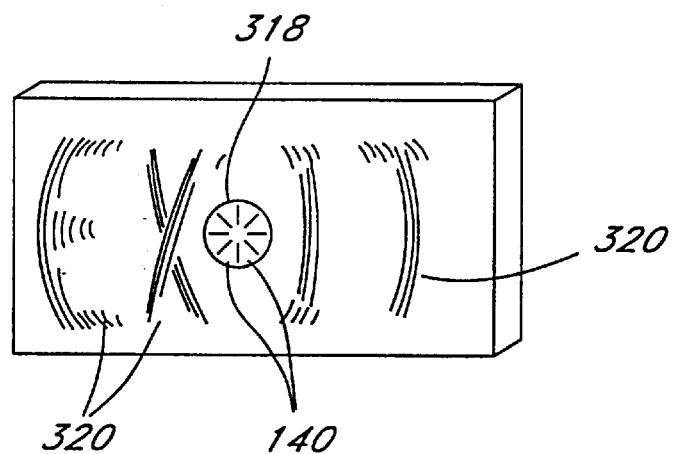
FIG. 29 is a perspective view of an exit sign incorporating circular grooves for extracting light.

As shown in FIG. 29, the length of the waveguiding cylinder 302 may be reduced so that the display element 142 consists of only the extractive display element 300 formed directly on the surface 134. These extractive display elements 300 are further disclosed in co-pending patent application Ser. No. 08/683,757, entitled "Light Extractor Apparatus," assigned to the same assignee. It has been found that these extraction elements efficiently extracting excess of 90% of incident radiation with less than 10% backscatter.

The base of each waveguiding cylinder 302 is preferably formed integral with the surface of the waveguide 301 to facilitate ease of manufacturing. The extractive display elements 300 and waveguiding cylinders 302 may be formed by conventional methods of molding plastic articles, such as injection or compression molding.

The contrast of the sign 130 utilizing extracting display elements 300 may be equalized by varying the characteristics of the display elements 300 across the surface of sign 130. For example, the diameters of the cylinders 302 that are closer to the illumination coupling means may be made less than the diameters of the cylinders 302 that are farther away from illumination coupling means to compensate for the greater light intensity that is typically present in the central regions of the sign. Decreasing the diameter of the cylinder 302 reduces the quantity of light that is delivered to the apex (or vertex) of the extractive display element 300.

FIG. 29 shows an exit sign 130 comprising a waveguide 132d. An illumination coupling means 318 is positioned in the interior of the waveguide 132d for injecting light into the waveguide 132d. The illumination coupling means include a plurality of LEDs 140. The waveguide 132d includes a series of concentric grooves 320 located on a back surface of the waveguide 132. The concentric circular grooves 320 preferably radiate outward from the central region of the waveguide 132d. The circular grooves 320 are positioned only in the areas where the symbolic or nonsymbolic characters of the sign are to be displayed and illuminated so that the circular grooves 320 form the shape of the characters. Preferably, utilizing concentric circular grooves 320 further optimizes the display by matching the symmetry of the light source or obtaining other desirable display properties.

Figure 30:
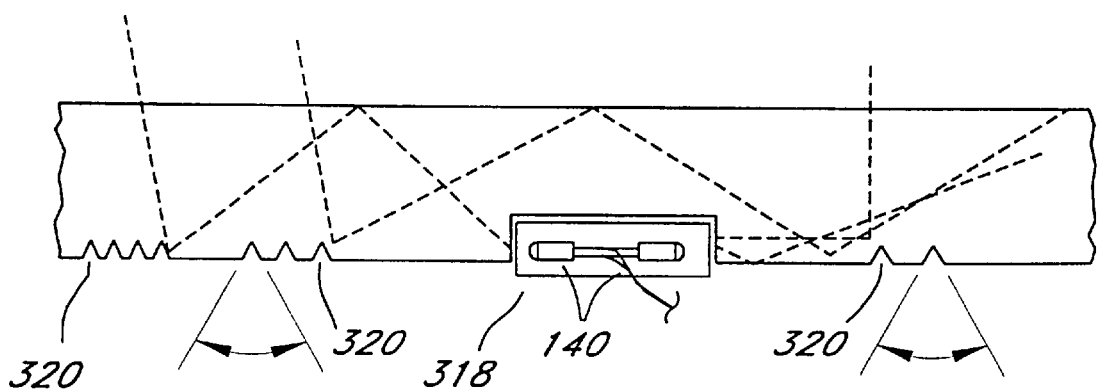
FIG. 30 is a cross-sectional side view of the exit sign of FIG. 29.

As shown in FIG. 30, the concentric circular grooves 320 are V-shaped structures that act to reflect light through the opposite side of the waveguide 132d. The grooves 320 define an angle between the surfaces of the "V," although the grooves may take other shapes than "V's". The circular grooves 320 differ from the display elements 142 both in the size and location. The depth of the circular grooves 320 may be only on the order of one-tenth of one percent (0.1%) to one percent (1%) of the waveguide 132d thickness.

The grooves 320 may be formed by any of a variety of methods including machining (mechanical, laser, or EDM), ablation, etching, stamping or embossing. They can also be formed initially over the entire surface of the waveguide and then subsequently filled in with an index matching material in all of the areas except those corresponding to the characters of the display. A decal film or screen may be applied to form the characters or to subsequently remove all but the selected areas. It is also possible to optimize the display characteristics by changing the properties of the grooves 320 at different points on the display. The spatial frequency, width or depth of the grooves 320 may increase at regions further removed from the illumination coupling means 318 in order to obtain desirable display characteristics.

Although the foregoing description of the preferred embodiments have shown, described, and pointed out certain novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited by the foregoing discussion, which is intended to illustrate rather than limit the scope of the invention.

What is claimed is:

1. A lighting apparatus, comprising:
   a device that emits light;
   an optical cavity formed by diffusive reflective surfaces, said cavity having an output region through which light from said cavity passes;

said light emitting device being mounted to supply light to said cavity while being hidden from direct view through said output region, said cavity having a diffusely reflective surface area and said output region having an area, the ratio of said area of said output region to the sum of (i) said area of said output region and (ii) said surface area of said cavity being at least 0.05, said cavity having a depth and said output region having an edge-to-edge bisector dimension, the ratio of said depth to said bisector dimension being significantly less than 0.1; and an angular spectrum restrictor positioned to restrict output illumination through said output region to a predetermined range of angles.

2. The apparatus of claim 1, wherein the angular spectrum restrictor comprises:

a diffuser at said output region, said diffuser positioned to diffuse illumination which passes from said cavity through said output region; and a brightness enhancing material disposed adjacent said diffuser, said material concentrating illumination within a viewing angle so as to enhance the brightness of the display panel.

3. The apparatus of claim 1, wherein said light emitting device comprises a fluorescent tube, and said cavity comprises a waveguide.

4. The apparatus of claim 1, wherein said ratio of said depth to said edge-to-edge dimension is no more than 0.03.

5. The apparatus of claim 1, wherein said ratio of said depth to said edge-to-edge dimension is less than 0.08.

6. The apparatus of claim 1, wherein said fluorescent tube is disposed between an edge of said waveguide and diffusive reflective material.

7. The apparatus of claim 1, wherein the reflective surfaces of said cavity have a reflectance higher than 90 percent.

8. The apparatus of claim 1, wherein said spectrum restrictor is planar and comprises micro-replicated optical structures.

9. The apparatus of claim 1, wherein said predetermined angle provides a viewing angle of no more than about 35 degrees.

10. The apparatus of claim 1, wherein said diffuser is between said brightness enhancing film and said optical cavity.

11. A method of lighting, comprising:

producing illumination from an optical cavity formed by diffusely reflecting surfaces and outputting illumination from the cavity through an output illumination region, said producing of said illumination comprising directing light rays from a source of illumination into the cavity such that the source of the illumination is not visible through the output illumination region;

restricting the angular spectrum of illumination from the output illumination region to a predetermined range of angles; said restricting comprising using a brightness enhancing film to concentrate light passing from the cavity through the output illumination region; and mounting the optical cavity to illuminate at least a portion of a room.

12. The method of claim 11, comprises:

using a diffuser to diffuse illumination passing from the cavity through the output illumination region.

13. The method of claim 11, wherein the source comprises one or more fluorescent tubes mounted adjacent a periphery of the cavity.

14. The method of claim 11, wherein said mounting comprises mounting the cavity so that the light is directed downwardly from a ceiling of a room towards a floor of the room.

* * * * *

UNITED STATES PATENT AND TRADEMARK OFFICE
CERTIFICATE OF CORRECTION

| | |
|---|---|
| PATENT NO. | : 6,647,199 B1 |
| APPLICATION NO. | : 09/334848 |
| DATED | : November 11, 2003 |
| INVENTOR(S) | : David G. Pelka et al. |

It is certified that error appears in the above-identified patent and that said Letters Patent is hereby corrected as shown below:

Title Page 2
Patent 5,438,495 delete "Ahlen" and insert --Åhlen-- therefor.

U.S. Patent Documents:
Insert --5,046,805–9/1991–Simon 385/31--
Insert --5,485,354–1/1996–Ciupke, et al. 362/31--
Insert --6,061,489–5/2000–Ezra et al. 385/115--

Column 2, Line 64, delete "light.emitting" and insert --light emitting-- therefor.

Column 7, Line 57, delete "eject"." and insert --eject"-- therefor.

Column 9, Line 15, delete "arc" and insert --are-- therefor.

Column 19, Line 9, Claim 1 delete "dimension, the ratio" and insert --dimension of at least 4 inches, the ratio-- therefor.

Column 19, Line 14, delete "range of angles" and insert --range of angles, said apparatus being sized and configured to illuminate an area within a room-- therefor.

Column 20, Line 20, delete "angles; said" and insert --angles, said-- therefor.

Column 20, Line 25, delete "comprises:" and insert --comprising:-- therefor.

Signed and Sealed this

Fifteenth Day of January, 2008

JON W. DUDAS
*Director of the United States Patent and Trademark Office*